US012501457B2

(12) United States Patent
Hosseini et al.

(10) Patent No.: US 12,501,457 B2
(45) Date of Patent: Dec. 16, 2025

(54) SIDELINK TRANSMISSION PRE-EMPTION

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 313 days.

(21) Appl. No.: 17/187,496

(22) Filed: Feb. 26, 2021

(65) Prior Publication Data

US 2022/0279500 A1  Sep. 1, 2022

(51) Int. Cl.
*H04W 72/51* (2023.01)
*H04W 72/566* (2023.01)
*H04W 76/14* (2018.01)

(52) U.S. Cl.
CPC ......... *H04W 72/51* (2023.01); *H04W 72/569* (2023.01); *H04W 76/14* (2018.02)

(58) Field of Classification Search
CPC .............................. H04W 76/14; H04W 92/18
See application file for complete search history.

(56) References Cited

U.S. PATENT DOCUMENTS

| 10,777,074 B1 * | 9/2020 | Tan .......................... H04W 4/90 |
| 2019/0068342 A1 * | 2/2019 | Kumar Parameswarn Rajamma ............ H04W 72/542 |
| 2019/0081720 A1 * | 3/2019 | Barry ................ H04W 56/0015 |
| 2020/0205165 A1 * | 6/2020 | Huang .................. H04L 1/1854 |
| 2020/0229171 A1 * | 7/2020 | Khoryaev ............. H04W 72/54 |
| 2021/0028891 A1 * | 1/2021 | Zhou ...................... H04L 5/0055 |
| 2021/0051653 A1 * | 2/2021 | Park ......................... H04W 8/22 |

(Continued)

FOREIGN PATENT DOCUMENTS

| WO | WO-2020197645 A1 * | 10/2020 | ........ H04W 72/0406 |
| WO | WO-2021015506 A1 * | 1/2021 | ........... H04L 1/1864 |
| WO | WO-2021067958 A1 * | 4/2021 | ............ H04W 72/02 |

OTHER PUBLICATIONS

Interdigital Communications: "Multiple Concurrent Destination within a Scheduling Period", 3GPP TSG-RAN WG2 #92, 3GPP Draft, R2-156699 Multitransmissions, 3rd Generation Partnership Project (3GPP), Mobile Competence Centre, 650, Route Des Lucioles, F-06921 Sophia-Antipolis Cedex, France, vol. RAN WG2, No. Anaheim, California, USA, Nov. 15, 2015-Nov. 22, 2015, Nov. 6, 2015 (Nov. 6, 2015), pp. 1-3, XP051024652, Retrieved from the Internet: URL: http://www.3gpp.org/ftp/tsg_ran/WG2RL2/TSGR2_92/Docs/, [retrieved on Nov. 6, 2015], The whole document.

(Continued)

*Primary Examiner* — Noel R Beharry
*Assistant Examiner* — Rodrick Mak
(74) *Attorney, Agent, or Firm* — Holland & Hart LLP

(57) ABSTRACT

Methods, systems, and devices for wireless communications are described. A user equipment (UE) may communicate sidelink messages over one or more carriers. The UE may schedule a first sidelink message for transmission on a first resource of a first carrier of a set of carriers on which the UE is configured for sidelink carrier aggregation. After scheduling the first sidelink message, the UE may schedule a second sidelink message for transmission on a second resource of a second carrier that at least partially overlaps in time with the first resource. The UE may determine that a transmission capability of the UE pertaining to the overlapping sidelink transmissions has been exceeded by scheduling the second sidelink message and may pre-empt transmission of the first sidelink message in favor of transmission of the second sidelink message based on the transmission capability of the UE being exceeded.

29 Claims, 12 Drawing Sheets

(56) References Cited

U.S. PATENT DOCUMENTS

| | | | | |
|---|---|---|---|---|
| 2021/0250772 | A1* | 8/2021 | Farag | H04W 16/02 |
| 2021/0314929 | A1* | 10/2021 | Li | H04W 72/53 |
| 2021/0345360 | A1* | 11/2021 | Yeo | H04W 72/20 |
| 2021/0385822 | A1* | 12/2021 | Chae | H04W 72/02 |
| 2022/0029861 | A1* | 1/2022 | Shahmohammadian | H04W 24/02 |
| 2022/0248240 | A1* | 8/2022 | Li | H04W 24/02 |
| 2022/0264590 | A1* | 8/2022 | Han | H04L 1/1854 |
| 2022/0279536 | A1* | 9/2022 | Khsiba | H04W 72/1263 |
| 2022/0279537 | A1* | 9/2022 | Freda | H04W 72/569 |
| 2022/0312438 | A1* | 9/2022 | Yi | H04W 72/23 |
| 2023/0064680 | A1* | 3/2023 | Huang | H04L 1/1848 |

OTHER PUBLICATIONS

International Search Report and Written Opinion—PCT/US2022/013521—ISA/EPO—Apr. 8, 2022.

ITRI: "Issues in NR Uu for Mode 3 NR Sidelink Resource Access", 3GPP Draft, 3GPP TSG-RAN WG1 Meeting #94, R1-1808727, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 10, 2018 (Aug. 10, 2018), XP051516101, pp. 1-6, Retrieved from the Internet: URL: https://www.3gpp.org/ftp/TSG_RAN/WG1_RL1/TSGR1_94/Docs/R1-1808727.zip, [retrieved on Aug. 10, 2018] section 3.2; pp. 3-4, The whole document.

Qualcomm: "Introduction of V2X", 3GPP TSG-RAN WG1 Meeting #99, 3GPP Draft, RP-192638, 3rd Generation Partnership Project (3GPP), Mobile Competence Centre, 650, Route Des Lucioles, F-06921 Sophia-Antipolis Cedex, France, vol. RAN WG1, No. Reno, NV, USA, Nov. 18, 2019-Nov. 22, 2019, Dec. 7, 2019 (Dec. 7, 2019), 10 Pages, XP051838463, Retrieved from the Internet: URL: https://ftp.3gpp.org/tsg_ran/TSG_RAN/TSGR_86/Docs/RP-192638.zip, 38202_CR0011_(Rel-16)_R1-1913640.docx [retrieved on Dec. 7, 2019], Section 6.3 Sidelink.

* cited by examiner

SIDELINK TRANSMISSION PRE-EMPTION

FIELD OF TECHNOLOGY

The following relates to wireless communications, including sidelink transmission pre-emption.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support sidelink communications between UEs. Additionally, UEs may support sidelink carrier aggregation in which the UEs may transmit concurrent sidelink messages on different carriers. A UE may have a limited transmission capability or reception capability that corresponds to a maximum quantity of concurrent sidelink messages that the UE may transmit or receive across a set of carriers. In some cases, the UE may schedule or be configured for more concurrent sidelink transmissions than that which is supported by the UE and may refrain from transmitting or receiving later-scheduled sidelink messages. However, in some cases, refraining from transmitting or receiving later-scheduled sidelink messages may reduce throughput and increase latency associated with communicating high priority sidelink messages.

SUMMARY

A method for wireless communication at a user equipment (UE) is described. The method may include scheduling a first sidelink message for transmission on a first resource of a first carrier of a set of multiple carriers on which the UE is configured for sidelink carrier aggregation, scheduling a second sidelink message after the first sidelink message is scheduled, the second sidelink message being scheduled for transmission on a second resource of a second carrier of the set of multiple carriers, the first resource and the second resource at least partially overlapping in time, determining that a transmission capability of the UE pertaining to overlapping sidelink transmissions has been exceeded by the scheduling of the second sidelink message, and pre-empting transmission of the first sidelink message in favor of transmission of the second sidelink message based on the transmission capability of the UE being exceeded.

An apparatus for wireless communication at a UE is described. The apparatus may include a processor, memory coupled with the processor, and instructions stored in the memory. The instructions may be executable by the processor to cause the apparatus to schedule a first sidelink message for transmission on a first resource of a first carrier of a set of multiple carriers on which the UE is configured for sidelink carrier aggregation, schedule a second sidelink message after the first sidelink message is scheduled, the second sidelink message being scheduled for transmission on a second resource of a second carrier of the set of multiple carriers, the first resource and the second resource at least partially overlapping in time, determine that a transmission capability of the UE pertaining to overlapping sidelink transmissions has been exceeded by the scheduling of the second sidelink message, and pre-empt transmission of the first sidelink message in favor of transmission of the second sidelink message based on the transmission capability of the UE being exceeded.

Another apparatus for wireless communication at a UE is described. The apparatus may include means for scheduling a first sidelink message for transmission on a first resource of a first carrier of a set of multiple carriers on which the UE is configured for sidelink carrier aggregation, means for scheduling a second sidelink message after the first sidelink message is scheduled, the second sidelink message being scheduled for transmission on a second resource of a second carrier of the set of multiple carriers, the first resource and the second resource at least partially overlapping in time, means for determining that a transmission capability of the UE pertaining to overlapping sidelink transmissions has been exceeded by the scheduling of the second sidelink message, and means for pre-empting transmission of the first sidelink message in favor of transmission of the second sidelink message based on the transmission capability of the UE being exceeded.

A non-transitory computer-readable medium storing code for wireless communication at a UE is described. The code may include instructions executable by a processor to schedule a first sidelink message for transmission on a first resource of a first carrier of a set of multiple carriers on which the UE is configured for sidelink carrier aggregation, schedule a second sidelink message after the first sidelink message is scheduled, the second sidelink message being scheduled for transmission on a second resource of a second carrier of the set of multiple carriers, the first resource and the second resource at least partially overlapping in time, determine that a transmission capability of the UE pertaining to overlapping sidelink transmissions has been exceeded by the scheduling of the second sidelink message, and pre-empt transmission of the first sidelink message in favor of transmission of the second sidelink message based on the transmission capability of the UE being exceeded.

DETAILED DESCRIPTION

Figure 1:
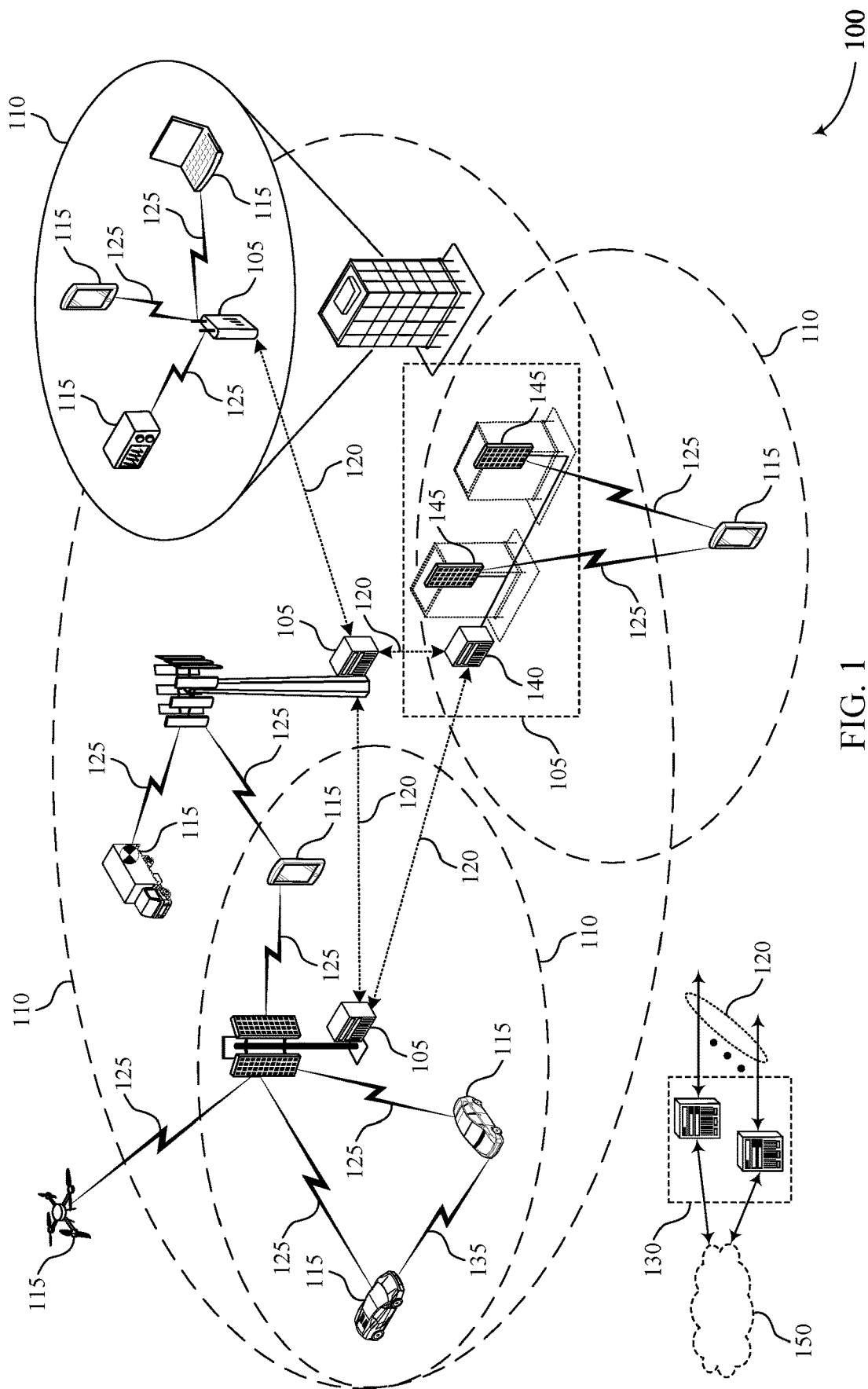
FIG. 1 illustrates an example of a wireless communications system that supports sidelink transmission pre-emption in accordance with aspects of the present disclosure.

Some wireless communications systems may support sidelinks for communications between communication devices. Sidelinks may refer to any communication link between similar communication devices such as user equipments (UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

In some examples, UEs may support sidelink carrier aggregation in which the UEs may transmit and/or receive concurrent sidelink messages on different carriers. Here, a UE may select and reserve resources independently on each aggregated carrier. In some examples, a UE may have a limited transmission capability. For example, a transmission capability of the UE may correspond to a maximum quantity of concurrent sidelink messages that the UE may transmit across a set of carriers, a transmission chain switching time, or a set of supported frequency band combinations, among other transmission capabilities. In some cases, the UE may schedule or be configured with concurrent sidelink transmissions such that the transmission capability of the UE may be exceeded and the UE may refrain from transmitting later-scheduled sidelink messages due to the transmission capability being exceeded. However, in some cases, refraining from transmitting later-scheduled sidelink messages may reduce throughput and increase latency associated with transmitting high priority sidelink messages. For example, the later-scheduled sidelink messages scheduled by the UE may be associated with a high priority. But if the UE schedules the sidelink message after scheduling other lower priority sidelink messages such that the transmission capability is exceeded, the UE may transmit the lower priority sidelink messages and delay transmitting the higher priority sidelink message.

Techniques, systems, and devices are described herein to pre-empt transmission of sidelink messages when a transmission capability of a UE is exceeded to increase throughput and reduce latency associated with transmitting sidelink messages. For example, a UE may schedule a first sidelink message for transmission on a first resource of a first carrier of a set of carriers when the UE is configured for sidelink carrier aggregation. After scheduling the first sidelink message, the UE may schedule a second sidelink message for transmission on a second resource of a second carrier that at least partially overlaps in time with the first resource. Scheduling the second sidelink message may result in the transmission capability of the UE being exceeded (e.g., a quantity of transmission chains of the UE may be less than the quantity of scheduled carriers, the UE may not support a frequency band combination of the scheduled sidelink messages, the UE may not support a transmission chain switching time associated with the scheduled sidelink messages, or a combination thereof).

The UE may determine that the transmission capability of the UE has been exceeded by scheduling the second sidelink message and may pre-empt transmission of the first sidelink message in favor of transmission of the second sidelink message based on the transmission capability of the UE being exceeded. Accordingly, the UE may transmit the second sidelink message while not transmitting the first sidelink message. In some examples, sidelink message pre-emption may be based on priorities associated with the first sidelink message and the second sidelink message. For example, the UE may determine that a first priority associated with the first sidelink messages is lower than a second priority associated with the second sidelink message. Thus, when the transmission capability of the UE is exceeded, the UE may pre-empt transmission of the first sidelink message in favor of transmission of the second sidelink message based on the first priority being lower than the second priority.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to transmitting sidelink messages. In some examples, pre-empting transmission of a first sidelink message in favor of transmission of a second sidelink message may increase throughput and reduce latency associated with transmitting high priority sidelink messages. In some other examples, the UE pre-empting transmission of the first sidelink message may provide improvements to data rates, power consumption, spectral efficiency, and, in some examples, may promote highly reliable communications, among other benefits.

Aspects of the disclosure are initially described in the context of wireless communications systems. Aspects of the disclosure are additionally described in the context of transmission schemes and a process flow. Aspects of the disclosure are further illustrated by and described with reference to apparatus diagrams, system diagrams, and flowcharts that relate to sidelink transmission pre-emption.

FIG. 1 illustrates an example of a wireless communications system 100 that supports sidelink transmission pre-emption in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between UEs 115 and, in some examples, may support sidelink carrier aggregation in which the UEs 115 may transmit and/or receive concurrent sidelink messages on different carriers. A UE 115 may have a limited transmission capability such as a maximum quantity of concurrent sidelink messages that the UE 115 may transmit across a set of carriers, a transmission chain switching time, or a set of supported frequency band combinations, among other transmission capabilities. In some cases, the UE 115 may schedule or be configured with concurrent sidelink transmissions such that the transmission capability of the UE 115 may be exceeded and the UE 115 may refrain from transmitting later-scheduled sidelink messages due to the transmission capability being exceeded. However, in some cases, refraining from transmitting later-scheduled sidelink messages may reduce throughput and increase latency associated with transmitting high priority sidelink messages, for example, if the later-scheduled sidelink message are associated with high priority sidelink messages.

Various aspects of the described techniques support network sidelink message pre-emption when a transmission capability of a UE 115 is exceeded to increase throughput and reduce latency associated with transmitting sidelink messages. For example, a UE 115 may schedule a first sidelink message for transmission on a first resource of a first carrier of a set of carriers when the UE 115 is configured for sidelink carrier aggregation. After scheduling the first sidelink message, the UE 115 may schedule a second sidelink message for transmission on a second resource of a second carrier that at least partially overlaps in time with the first resource. Scheduling the second sidelink message may result in the transmission capability of the UE 115 being exceeded. The UE 115 may determine that the transmission capability of the UE 115 has been exceeded by scheduling the second sidelink message and may pre-empt transmission of the first sidelink message in favor of transmission of the second sidelink message based on the transmission capability of the UE 115 being exceeded. Accordingly, the UE 115 may transmit the second sidelink message while not transmitting the first sidelink message.

Figure 2:
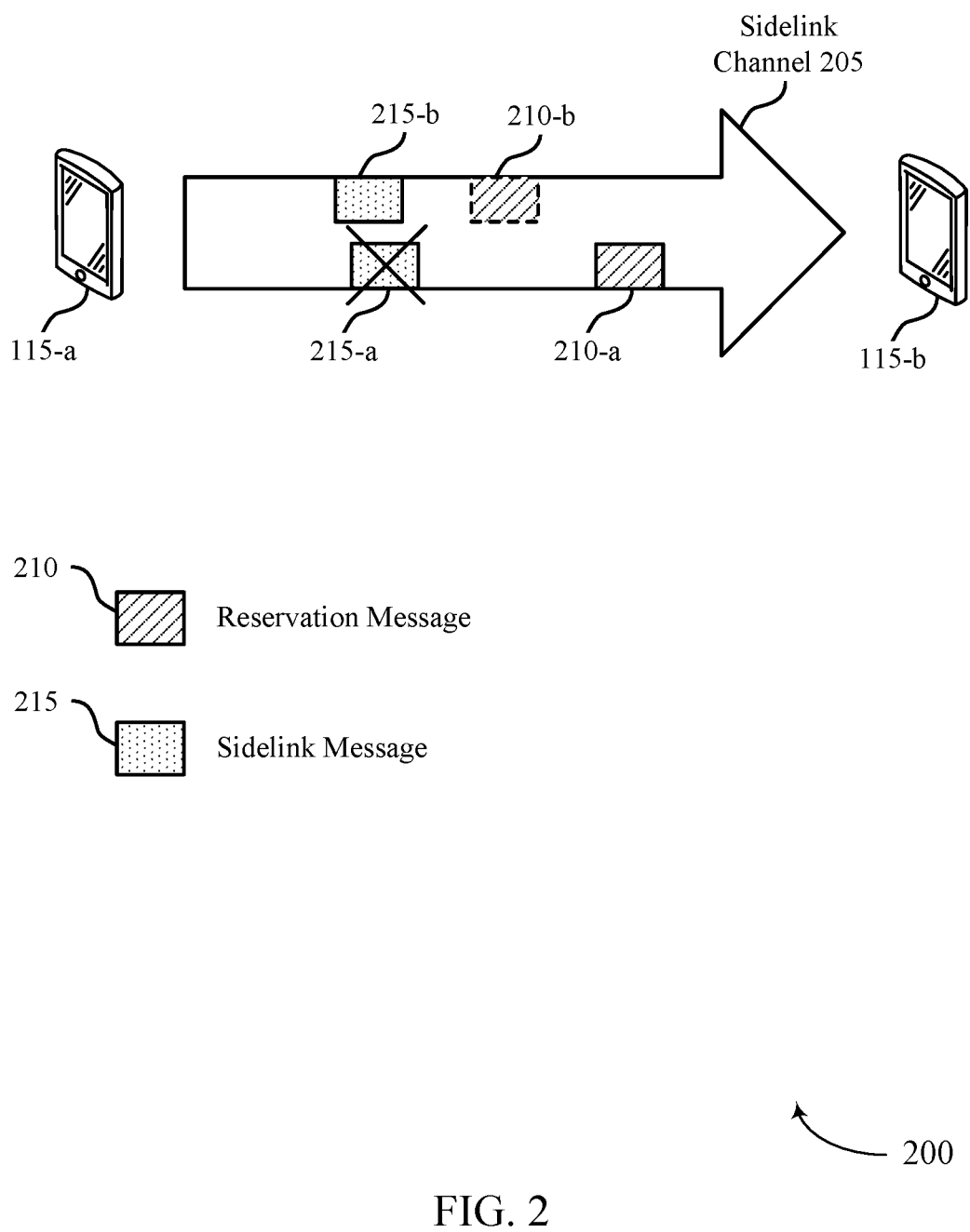
FIG. 2 illustrates an example of a wireless communications system that supports sidelink transmission pre-emption in accordance with aspects of the present disclosure.

FIG. 2 illustrates an example of a wireless communications system 200 that supports sidelink transmission pre-emption in accordance with aspects of the present disclosure. In some example, the wireless communications system 200 may implement aspects of the wireless communications system 100. For example, the wireless communications system 200 may include a UE 115-*a* and a UE 115-*b*, which may be examples of a UE 115 as described with reference to FIG. 1. The UE 115-*a* may communicate with the UE 115-*b* via the sidelink channel 205, which may be an example of a communication link 135 as described with reference to FIG. 1. In some examples, the sidelink channel 205 may be a sidelink control channel (e.g., a physical sidelink control channel (PSCCH)), a sidelink shared channel (e.g., a physical sidelink shared channel (PSSCH)), a sidelink feedback channel (e.g., a physical sidelink feedback channel (PSFCH)), or a combination thereof. The wireless communications system 200 may support multiple radio access technologies including 4G systems such as LTE systems, LTE-A systems, or LTE-A Pro systems, and 5G systems, which may be referred to as NR systems, or a combination of these or other radio access technologies. In some examples, the UE 115-*a* may implement sidelink message pre-emption to increase throughput and reduce latency associated with sidelink message transmission.

The wireless communications system 200 may be an example of a sidelink network. The wireless communications system 200 may be configurable to operate according to one or more resource allocation modes, for example, "Mode 1" and/or a "Mode 2." While operating in Mode 1, the sidelink network may be managed (e.g., coordinated) by a base station 105, as described with reference to FIG. 1 (not shown). In this regard, during Mode 1 operation, the base station 105 may manage resource allocation over the sidelink channel 205.

While operating in Mode 2, the sidelink network may not be managed or coordinated by the base station 105. Without coordination or management of the resources of the sidelink network during the Mode 2 operation, the UEs 115 (e.g., the UE 115-a, the UE 115-b, additional UEs 115 (not shown)) of the wireless communications system 200 may follow contention-based access procedures in which the various UEs 115 may reserve sidelink resources of the sidelink network, including the sidelink channel 205. For example, during Mode 2 operation, the UE 115-a and the UE 115-b may monitor the sidelink network of the wireless communications system 200 to determine if other UEs 115 are attempting to transmit over the sidelink network. For instance, the UE 115-a and the UE 115-b may decode reservation messages 210 (e.g., sidelink control channel transmissions such as sidelink control information (SCI)-1 messages, SCI-2 messages, request-to-send-messages, or some other sidelink control channel transmissions) and may determine which sidelink resources are reserved for other sidelink communications based on measuring a reference signal received power (RSRP) and demodulation reference signals (DMRSs) of the reservation messages 210.

The wireless communications system 200 may additionally support sidelink carrier aggregation in which the UE 115-a and the UE 115-b may transmit and receive concurrent sidelink messages on different carriers. Here, the UE 115-a and the UE 115-b may select and reserve resources independently on each aggregated carrier. For example, the sidelink channel 205 may include a set of aggregated carriers in a frequency domain. The UE 115-a may determine to transmit and may schedule a sidelink message 215-a for transmission on a resource of a first carrier of the sidelink channel 205. To schedule the sidelink message 215-a, the UE 115-a may transmit a reservation message 210-a (e.g., on the first carrier) to one or more UEs 115, including the UE 115-b, that reserves the resource of the first carrier for transmission of the sidelink message 215-a.

Additionally, the UE 115-a may determine to transmit and may schedule a sidelink message 215-b for transmission on a resource of a second carrier of the sidelink channel 205 (e.g., after scheduling the sidelink message 215-a). In some examples, to schedule the sidelink message 215-b, the UE 115-a may transmit a reservation message 210-b (e.g., on the second carrier) to one or more UEs 115, including the UE 115-b, that reserves the resource of the second carrier for transmission of the sidelink message 215-b. In some cases, the resource of the second carrier may overlap at least partially in time with the resource of the first carrier. In some other examples, the sidelink message 215-b may be a reservation message 210. Here, the UE 115-a may not transmit the reservation message 210-b. Instead, the UE 115-a may schedule transmission of the sidelink message 215-b by selecting the resource of the second carrier that overlaps at least partially in time with the resource of the first carrier. In some examples, the sidelink message 215-a and the sidelink message 215-b are directed to a same UE 115 (e.g., the UE 115-b) or to different UEs 115. In some examples, the sidelink message 215-a and the sidelink message 215-b are of a same cast type (e.g., broadcast, groupcast, unicast, or some other cast type) or of different cast types.

The UE 115-a and the UE 115-b may each have an associated transmission capability and a reception capability. In some examples, the transmission capabilities of the UE 115-a and the UE 115-b may correspond to a maximum quantity of concurrent sidelink messages that the UE 115-a or the UE 115-b may transmit across a set of carriers, a transmission chain switching time, a set of supported frequency band combinations, or some other transmission capability. In some examples, the reception capabilities of the UE 115-a and the UE 115-b may correspond to a maximum quantity of concurrent sidelink messages that the UE 115-a or the UE 115-b may receive across the set of carriers, a receive chain switching time, a set of supported frequency band combinations, or some other reception capability. In some cases, the UE 115-a may determine that scheduling the sidelink message 215-b causes the transmission capability of the UE 115-a to be exceeded. Based on the transmission capability of the UE 115-a being exceeded, in some cases, the UE 115-a may determine to delay transmission of later-scheduled sidelink messages 215. For example, the UE 115-a may refrain from transmitting the sidelink message 215-b based on the transmission capability of the UE 115-a. However, if the sidelink message 215-b is associated with a priority higher than a priority associated with the sidelink message 215-a, refraining from transmitting the sidelink message 215-b may reduce throughput and increase latency of the wireless communications system 200.

Alternatively in some cases, the UE 115-a may refrain from scheduling the sidelink message 215-b if the UE 115-a determines that scheduling the sidelink message 215-b causes the transmission capability of the UE 115-a to be exceeded. For example, the UE 115-a may schedule the sidelink message 215-a for a particular slot and may determine that scheduling an additional sidelink message 215 for the slot will cause the transmission capability of the UE 115-a to be exceeded. Based on the determination, the UE 115-a may exclude any resources of the slot (e.g., the resource of the second carrier) when selecting resources to use to schedule or transmit the sidelink message 215-b and may delay scheduling the sidelink message 215-b until a subsequent slot. However, delaying scheduling the sidelink message 215-b may reduce throughput and increase latency of the wireless communications system 200 if the sidelink message 215-b is a high priority message.

To increase throughput and reduce latency associated with transmitting sidelink messages 215, the UE 115-a may pre-empt transmission of the sidelink message 215-a in favor of transmission of the sidelink message 215-b if the transmission capability of the UE 115-a is exceeded. For example, the UE 115-a may determine a first priority associated with the sidelink message 215-a and a second priority associated with the sidelink message 215-b. The UE 115-a may determine that the first priority is lower than the second priority and may pre-empt transmission of the sidelink message 215-a in favor of transmission of the sidelink message 215-b based on the first priority being lower than the second priority. Accordingly, the UE 115-a may transmit the sidelink message 215-b while not transmitting the sidelink message 215-a. In some examples, the resource of the first carrier and the resource of the second carrier may be associated with a same slot. Accordingly, based on determining that the first priority is lower than the second priority, the UE 115-a may include the resource of the second carrier when selecting resources to use to schedule or transmit the sidelink message 215-b.

The UE 115-a may perform sidelink message pre-emption based on one or more parameters. For example, the sidelink message 215-a and the sidelink message 215-b may be any one of sidelink control channel (e.g., PSCCH) messages for reservation of resources, sidelink shared channel (e.g., PSSCH) messages on reserved resources, sidelink feedback channel (e.g., PSFCH) messages, or any combination thereof. Based on a channel type (e.g., PSCCH, PSSCH, PSFCH, or some other channel type) associated with the sidelink message 215-*a* or the sidelink message 215-*b*, or both, the UE 115-*a* may pre-empt transmission of the sidelink message 215-*a* in favor of the sidelink message 215-*b*. Additionally, or alternatively, the UE 115-*a* may pre-empt transmission of the sidelink message 215-*a* in favor of the sidelink message 215-*b* based on a cast type associated with the sidelink message 215-*a* or the sidelink message 215-*b*, or both, a transmission power associated with the sidelink message 215-*a* or the sidelink message 215-*b*, or both, a resource allocation mode (e.g., Mode 1, Mode 2) associated with the sidelink message 215-*a* or the sidelink message 215-*b*, or both, or a combination thereof. For example, the UE 115-*a* may prioritize broadcast messages over groupcast messages and unicast messages and may prioritize groupcast messages over unicast messages, however, that other cast type priorities are possible. In some examples, the UE 115-*a* may prioritize Mode 1 messages over Mode 2 messages or vice versa.

Additionally, or alternatively, the UE 115-*a* may perform sidelink message pre-emption based on information carried by the sidelink message 215-*a* and the sidelink message 215-*b*. For example, the UE 115-*a* may pre-empt transmission of the sidelink message 215-*a* in favor of the sidelink message 215-*b* based on whether the sidelink message 215-*a*, or the sidelink message 215-*b*, or both, include a channel state information-reference signal (CSI-RS) report, a CSI-RS resource, HARQ feedback, or a combination thereof.

Additionally, or alternatively, the UE 115-*a* may perform sidelink message pre-emption based on destination identifier (ID) associated with the sidelink message 215-*a* or the sidelink message 215-*b*, or both, a zone ID associated with the sidelink message 215-*a* or the sidelink message 215-*b*, or both, a carrier index associated with the sidelink message 215-*a* or the sidelink message 215-*b*, or both, a resource pool index associated with the sidelink message 215-*a* or the sidelink message 215-*b*, or both, a channel busy ratio (CBR) associated with the sidelink message 215-*a* or the sidelink message 215-*b*, or both, a channel occupancy ratio (CR) associated with the sidelink message 215-*a* or the sidelink message 215-*b*, or both, or a combination thereof. In some examples, different regions may have different rules for determining priorities of sidelink messages 215. Here, the zone ID may be used to determine the associated rules for determining sidelink message priority.

As a result of performing sidelink message pre-emption, the wireless communications system 200 may include features for the improvements to efficiency and resource usage in sidelink communications and, in some examples, may increase throughput and decrease latency. In some other examples, the wireless communications system 200 may provide improvements to power consumption and spectral efficiency, among other benefits.

Figure 3:
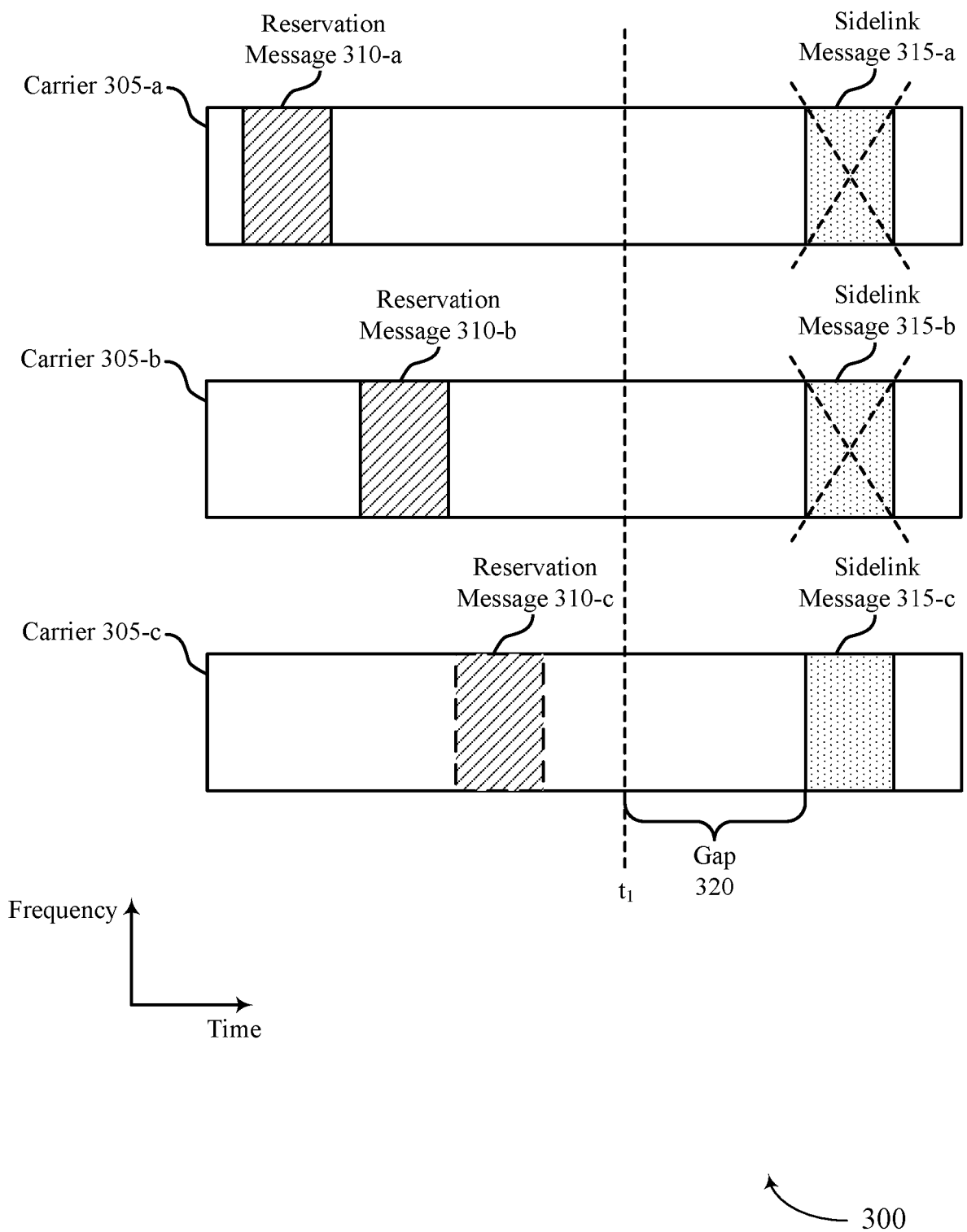
FIG. 3 illustrates an example of a transmission scheme that supports sidelink transmission pre-emption in accordance with aspects of the present disclosure.

FIG. 3 illustrates an example of a transmission scheme 300 that supports sidelink transmission pre-emption in accordance with aspects of the present disclosure. In some examples, the transmission scheme 300 may implement aspects of the wireless communications systems 100 and 200 as described with reference to FIGS. 1 and 2, respectively. For example, the transmission scheme 300 may be implemented by a UE 115, which may be an example of a UE 115 as described with reference to FIGS. 1 and 2, respectively. The transmission scheme 300 may be implemented by the UE 115 to pre-empt transmission of lower-priority sidelink messages in favor of higher-priority sidelink messages to improve efficiency and resource usage for sidelink communications and promote low latency communications, among other benefits.

The transmission scheme 300 illustrates an example of a set of carriers 305 for sidelink transmissions. For example, the transmission scheme 300 illustrates a carrier 305-*a*, a carrier 305-*b*, and a carrier 305-*c*. Each carrier 305 (e.g., a component carrier) may span a bandwidth in a frequency domain and may include a quantity of slots in a time domain. Different carriers 305 may span the same or different carrier bandwidths.

The UE 115 may support sidelink carrier aggregation in which the UE 115 may transmit concurrent sidelink messages 315 on different carriers 305. Here, the UE 115 may schedule transmission of sidelink messages 315 independently on each aggregated carrier 305. For example, the UE 115 may determine to transmit a sidelink message 315-*a* on the carrier 305-*a*, a sidelink message 315-*b* on the carrier 305-*b*, and a sidelink message 315-*c* on the carrier 305-*c*. In some examples, the UE 115 may schedule transmission of the sidelink message 315-*c* after scheduling transmission of the sidelink message 315-*a* and the sidelink message 315-*b*.

The UE 115 may select and/or reserve resources for transmission of the sidelink messages 315 based on scheduling transmission of the sidelink messages 315. For example, the UE 115 may select a resource for transmission of the sidelink message 315-*a*, a resource for transmission of the sidelink message 315-*b*, and a resource for transmission of the sidelink message 315-*c*. In some examples, the UE 115 may reserve the resources by transmitting corresponding reservation messages 310 (e.g., SCI messages) to one or more other UEs 115. For example, the UE 115 may reserve the resource for the sidelink message 315-*a* by transmitting a reservation message 310-*a* to the one or more other UEs 115, the resource for the sidelink message 315-*b* by transmitting a reservation message 310-*b* to the one or more other UEs 115, and the resource for the sidelink message 315-*c* by transmitting a reservation message 310-*c* to the one or more other UEs 115. In some examples, the sidelink message 315-*c* may be a reservation message 310 to reserve a resource for a subsequent sidelink message 315 on the carrier 305-*c*. Here, the UE 115 may not transmit the reservation message 310-*c* and may instead schedule transmission of the sidelink message 315-*c* using the selected resource for transmission of the sidelink message 315-*c*.

The UE 115 may have a transmission capability that is exceeded by the scheduling of the sidelink message 315-*c*. For example, the selected resources for transmission of the sidelink messages 315-*a*, 315-*b*, and 315-*c* may overlap at least partially in the time domain. In the example of FIG. 3, the UE 115 may have a transmission capability such that the UE 115 may transmit two concurrent sidelink messages 315 across the carriers 305. Accordingly, scheduling the sidelink message 315-*c* may result in three concurrent sidelink messages 315 across the carriers 305, thereby exceeding the transmission capability of the UE 115. The UE 115 may pre-empt transmission of the sidelink message 315-*a* or the sidelink message 315-*b* in favor of transmission of the sidelink message 315-*c*, for example, if the sidelink message 315-*c* is associated with a priority that is higher than a priority of the sidelink message 315-*a* or the sidelink message 315-*b*.

The UE 115 may additionally perform sidelink message pre-emption according to a timeline. For example, a timeline may be defined (e.g., network configured or pre-configured) such that the UE 115 may have sufficient time to pre-empt transmission of the sidelink message 315-*a* or the sidelink message 315-*b* after scheduling the sidelink message 315-*c*.

The timeline may define a gap 320 that indicates a threshold period of time prior to the selected overlapping resources by which the UE 115 may perform sidelink message pre-emption. For example, if the UE 115 schedules the sidelink message 315-c prior to time t1, the UE 115 may pre-empt transmission of the sidelink message 315-a or the sidelink message 315-b in favor of the sidelink message 315-c. If the UE 115 schedules the sidelink message 315-c after time t1, the UE 115 may determine that the sidelink message 315-c was not scheduled at least the threshold time prior to the selected overlapping resources and may refrain from transmitting the sidelink message 315-c until a subsequent slot.

Figure 4:
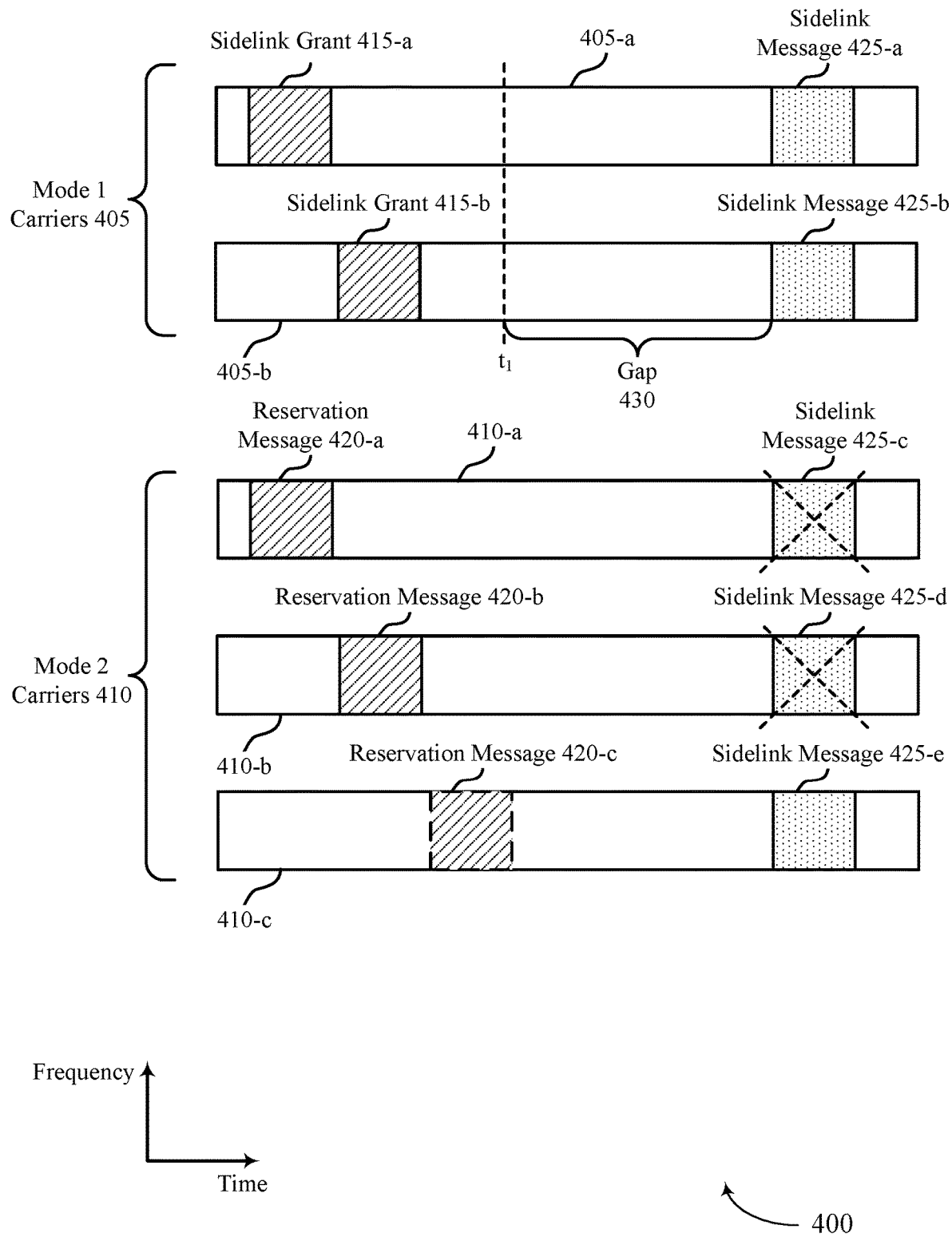
FIG. 4 illustrates an example of a transmission scheme that supports sidelink transmission pre-emption in accordance with aspects of the present disclosure.

FIG. 4 illustrates an example of a transmission scheme 400 that supports sidelink transmission pre-emption in accordance with aspects of the present disclosure. In some examples, the transmission scheme 400 may implement aspects of the wireless communications systems 100 and 200 as described with reference to FIGS. 1 and 2, respectively. For example, the transmission scheme 400 may be implemented by a UE 115, which may be an example of a UE 115 as described with reference to FIGS. 1 and 2, respectively. The transmission scheme 400 may be implemented by the UE 115 to pre-empt transmission of lower-priority sidelink messages in favor of higher-priority sidelink messages to improve efficiency and resource usage for sidelink communications and promote low latency communications, among other benefits.

The transmission scheme 400 illustrates examples sets of carriers for sidelink transmissions. For example, the transmission scheme 400 illustrates a set of Mode 1 carriers 405 and a set of Mode 2 carriers 410. Each carrier 405 and carrier 410 may span a bandwidth in a frequency domain and may include a quantity of slots in a time domain. Different carriers may span the same or different carrier bandwidths.

The UE 115 may support sidelink carrier aggregation in which the UE 115 may transmit concurrent sidelink messages 425 on different carriers. In some examples, the UE 115 may operate according to different resource allocation modes on different sets of carriers. For example, the UE 115 may operate according to Mode 1 for a first set of carriers (e.g., Mode 1 carriers 405) and may operate according to Mode 2 for a second set of carriers (e.g., Mode 2 carriers 410). In the example of FIG. 4, a base station 105 may manage resource allocation over the Mode 1 carriers 405 that include a carrier 405-a and a carrier 405-b, and the UE 115 may follow contention-based access procedures for resource allocation over the Mode 2 carriers 410 that include a carrier 410-a, a carrier 410-b, a carrier 410-c. For example, the base station 105 may transmit a sidelink grant 415 to the UE 115 to schedule a corresponding sidelink message 425 on a Mode 1 carrier 405, and the UE 115 may transmit a reservation message 420 to reserve resources for a scheduled sidelink message 425.

The UE 115 may have a transmission capability that is divided into a first transmission capability associated with the Mode 1 carriers 405 and a second transmission capability associated with the Mode 2 carriers 410. For example, the first transmission capability may correspond to a quantity of concurrent sidelink messages 425 that the UE 115 may transmit across the Mode 1 carriers 405, and the second transmission capability may correspond to a quantity of concurrent sidelink messages 425 that the UE 115 may transmit across the Mode 2 carriers 410. In some examples, the second transmission capability may be based on a quantity of concurrent sidelink messages 425 scheduled across the Mode 1 carriers 405. For example, if no sidelink messages 425 are scheduled across the Mode 1 carriers 405, the second transmission capability may correspond to the maximum quantity of concurrent sidelink messages 425 that the UE 115 may transmit. If one or more sidelink messages 425 are scheduled across the Mode 1 carriers 405, the second transmission capability may correspond to the maximum quantity of concurrent sidelink messages 425 that the UE 115 may transmit minus the number of sidelink messages 425 scheduled across the Mode 1 carriers 405. In some cases, the second transmission capability may correspond to some network configured or pre-configured quantity. In some examples, the first transmission capability may correspond to a quantity (e.g., network configured or pre-configured) that is less than or equal to the maximum quantity of concurrent sidelink messages 425 that the UE 115 may transmit.

The UE 115 may report the first transmission capability to the base station 105, and the base station 105 may schedule sidelink messages 425 for transmission across the Mode 1 carriers 405 according to the first transmission capability. For example, if the report indicates that the UE 115 may transmit up to two concurrent sidelink messages 425 across the Mode 1 carriers 405, the base station 105 may not attempt to schedule more than two concurrent sidelink messages 425 across the Mode 1 carriers 405. For example, the base station 105 may transmit, to the UE 115, a sidelink grant 415-a that schedules a sidelink message 425-a for transmission on a resource of the carrier 405-a, or a sidelink grant 415-b that schedules a sidelink message 425-b for concurrent transmission on a resource of the carrier 405-b, or both, based on the first transmission capability. In some examples, the base station 105 may transmit any quantity of sidelink grants 415 to schedule concurrent transmission of sidelink messages 425 that is less than the quantity of concurrent sidelink messages 425 indicated by the report of the first transmission capability.

Additionally, the UE 115 may schedule transmission of sidelink messages 425 on resources of the Mode 2 carriers 410 that overlap at least partially in time with the scheduled resources of the Mode 1 carriers 405. For example, the UE 115 may schedule transmission of a sidelink message 425-c on a resource of the carrier 410-a, a sidelink message 425-d on a resource of the carrier 410-b, and a sidelink message 425-e on a resource of the carrier 410-c, where the scheduled resources of the carriers 410-a, 410-b, and 410-c overlap at least partially in time with the scheduled resources of the carriers 405-a and 405-b. In some examples, the UE 115 may schedule the sidelink message 425-e after scheduling the sidelink message 425-c and the sidelink message 425-d. The UE 115 may transmit a reservation message 420-a to reserve the resource on the carrier 410-a, a reservation message 420-b to reserve the resource on the carrier 410-b, and reservation message 420-c to reserve the resource on the carrier 410-c. In some examples, the sidelink message 425-e may be a reservation message 420 to reserve a resource for a subsequent sidelink message 425 on the carrier 410-c. Here, the UE 115 may select the resource on the carrier 410-c without transmitting the reservation message 420-c to schedule the transmission of the sidelink message 425-e.

The UE 115 may pre-empt transmission of a sidelink message 425 on a Mode 2 carrier 410 based on a quantity of sidelink messages 425 scheduled across the Mode 1 carriers 405. For example, the UE 115 may update the second transmission capability based on the quantity of sidelink messages 425 scheduled across the Mode 1 carriers 405. For example, if the UE 115 has a transmission capability such that the UE 115 may transmit four concurrent sidelink messages 425 and the base station 105 schedules transmission of two sidelink messages 425 across the Mode 1 carriers 405, the UE 115 may update the second transmission capability to indicate that the UE 115 may transmit two concurrent sidelink messages 425 across the Mode 2 carriers 410. Accordingly, in the example of FIG. 4, scheduling the sidelink message 425-e may exceed the second transmission capability and the UE 115 may pre-empt transmission of the sidelink message 425-c or the sidelink message 425-d in favor of the sidelink message 425-e based on the second transmission capability being exceeded.

The UE 115 may additionally perform sidelink message pre-emption according to a timeline. For example, a timeline may be defined (e.g., network configured or pre-configured) such that the UE 115 may determine whether sidelink messages 425 will be scheduled across the Mode 1 carriers 405 (e.g., or across a resource pool that includes the Mode 1 carriers 405). The timeline may define a gap 430 that indicates a threshold period of time prior to the selected overlapping resources by which the base station 105 may schedule a sidelink message 425 on a Mode 1 carrier 405. For example, after time t1, the UE 115 may assume that no additional sidelink messages 425 may be scheduled on a Mode 1 carrier 405. The UE 115 may update the second transmission capability based on the quantity of sidelink messages 425 scheduled on Mode 1 carriers 405 prior to time t1. For example, if the base station 105 does not schedule one or more of the sidelink messages 425-a and 425-b prior to time t1, the UE 115 may assume that no additional sidelink messages 425 will be scheduled by the base station 105. Here the UE 115 may update the second transmission capability to correspond to the maximum quantity of concurrent sidelink messages 425 that the UE 115 may transmit minus the quantity of concurrent sidelink messages 425 scheduled by the base station 105. In the example of FIG. 4, if the base station 105 does not schedule one or more of the sidelink messages 425-a and 425-b prior to time t1, the UE 115 may determine that scheduling the sidelink message 425-e does not exceed the second transmission capability, and the UE 115 may transmit the sidelink messages 425-c, 425-d, and 425-e.

Alternatively, the UE 115 may independently report the first transmission capability and the second transmission capability and may perform sidelink message pre-emption accordingly. For example, UE 115 may report the first transmission capability to the base station 105, and the base station 105 may schedule sidelink messages 425 for transmission across the Mode 1 carriers 405 according to the first transmission capability. The UE 115 may separately report the second transmission capability that corresponds to, for example, a network configured or pre-configured quantity of concurrent sidelink messages 425 that the UE 115 may transmit across the Mode 2 carriers 410 such that a total quantity of concurrent sidelink messages 425 indicated by the first transmission capability and the second transmission capability is less than or equal to the maximum quantity of concurrent sidelink messages 425 that the UE 115 may transmit. Here, the UE 115 may perform sidelink message pre-emption on the Mode 2 carriers 410 according to the second transmission capability (e.g., without determining whether the base station 105 schedules sidelink messages 425 across the Mode 1 carriers 405).

Figure 5:
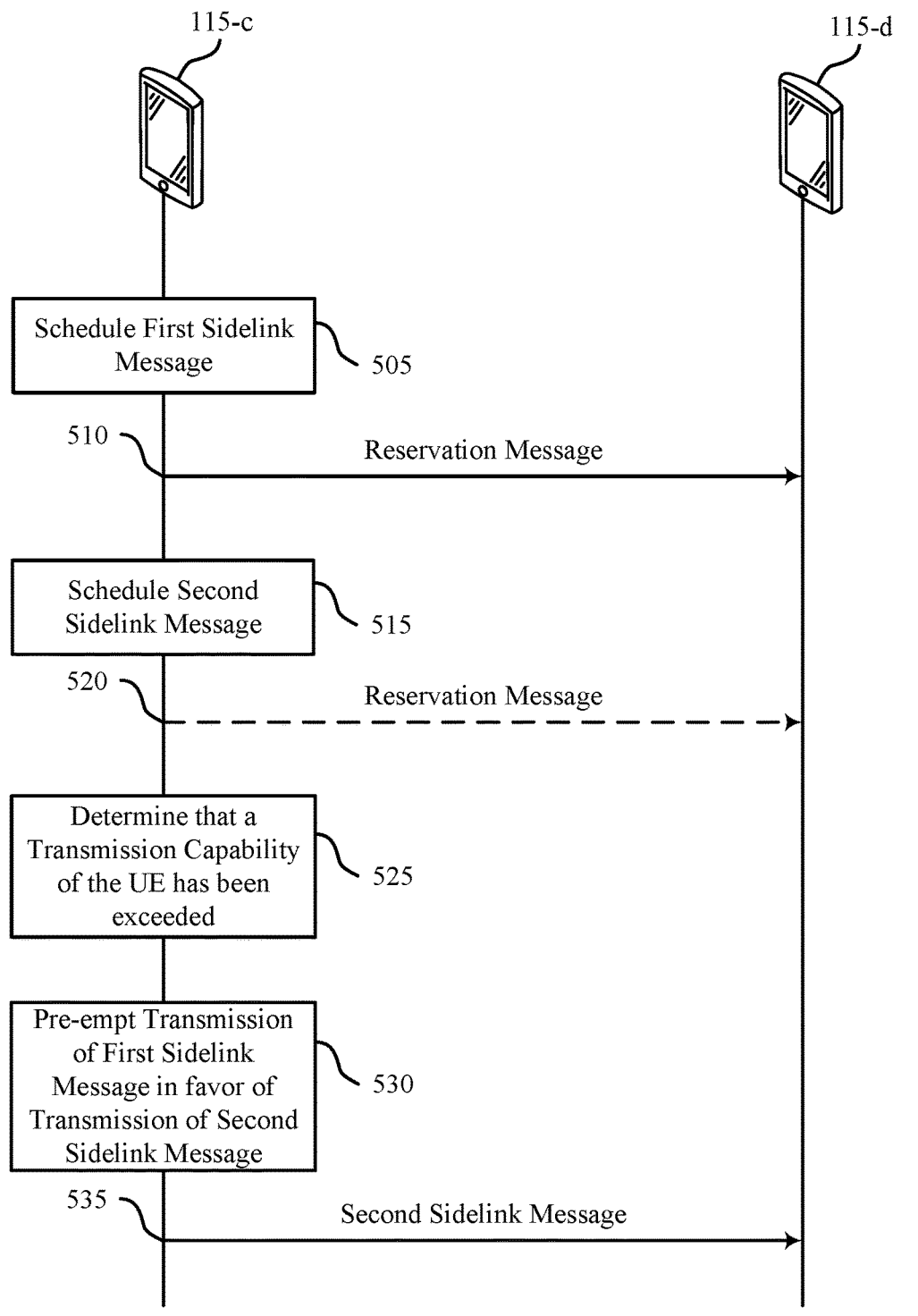
FIG. 5 illustrates an example of a process flow that supports sidelink transmission pre-emption in accordance with aspects of the present disclosure.

FIG. 5 illustrates an example of a process flow 500 that supports sidelink transmission pre-emption in accordance with aspects of the present disclosure. In some examples, the process flow 500 may implement aspects of the wireless communications systems 100 and 200 as described with reference to FIGS. 1 and 2, respectively. For example, the process flow 500 may be implemented by a UE 115-c and a UE 115-d, which may be examples of a UE 115 as described with reference to FIGS. 1 and 2. The process flow 500 may be implemented by the UE 115-c and the UE 115-d to support sidelink message pre-emption when a transmission capability of the UE 115-c is exceeded. The process flow 500 may further be implemented by the UE 115-c and the UE 115-d to potentially reduce latency increase throughput (e.g., based on pre-empting lower-priority sidelink transmissions in favor of higher-priority sidelink transmissions), among other benefits.

In the following description of the process flow 500, the operations between the UE 115-c and the UE 115-d may be communicated in a different order than the example order shown, or the operations performed by the UE 115-c and the UE 115-d may be performed in different orders or at different times. Some operations may also be omitted from the process flow 500, and other operations may be added to the process flow 500.

At 505, the UE 115-c may schedule a first sidelink message for transmission on a first resource of a first carrier of a set of carriers. For example, the UE 115-c may support sidelink carrier aggregation in which the UE 115-c may transmit concurrent sidelink messages across the set of carriers. The UE 115-c may determine to transmit the first sidelink message and may select the first resource for transmission of the first sidelink message.

At 510, to reserve the first resource, the UE 115-c may transmit a reservation message to the UE 115-d (e.g., and to one or more additional UEs 115). In some examples, the reservation message may be a sidelink control channel transmission such as an SCI-1 messages, an SCI-2 message, a request-to-send-message, or some other sidelink control channel transmissions.

At 515, the UE 115-c may schedule a second sidelink message for transmission on a second resource of a second carrier of the set of carriers. For example, the UE 115-c may determine to transmit the second sidelink message and may select the second resource for transmission of the second sidelink message, where the second resource at least partially overlaps in time with the first resource.

At 520, the UE 115-c may optionally transmit a reservation message to the UE 115-d (e.g., and to one or more additional UEs 115) that reserves the second resource. For example, At 525, the UE 115-c may determine that a transmission capability of the UE 115-c has been exceeded. For example, the transmission capability of the UE 115-c may correspond to a maximum quantity of concurrent sidelink messages that the UE 115-c may transmit across the set of carriers, a transmission chain switching time, a set of supported frequency band combinations, or a combination thereof. The UE 115-c may determine that, by scheduling the second sidelink message, a quantity of transmission chains of the UE 115-c may be less than the quantity of scheduled sidelink messages, the UE 115-c may not support a frequency band combination of the scheduled sidelink messages, the UE 115-c may not support a transmission chain switching time associated with the scheduled sidelink messages, or a combination thereof, and thus determine that the transmission capability of the UE 115-c has been exceeded.

At 530, the UE 115-c may pre-empt transmission of the first sidelink message in favor of transmission of the second sidelink message based on the transmission capability of the UE 115-c being exceeded. For example, the UE 115-c may determine that a first priority associated with the first sidelink message is lower than a second priority associated with the second sidelink message. The UE 115-*c* may pre-empt transmission of the first sidelink message in favor of transmission of the second sidelink message based on the first priority being lower than the second priority. Accordingly, at 535, the UE 115-*c* may transmit the second sidelink message to the UE 115-*d* while not transmitting the first sidelink message. In this way, the UE 115-*c* may increase throughput and reduce latency associated with transmitting high priority sidelink messages.

Figure 6:
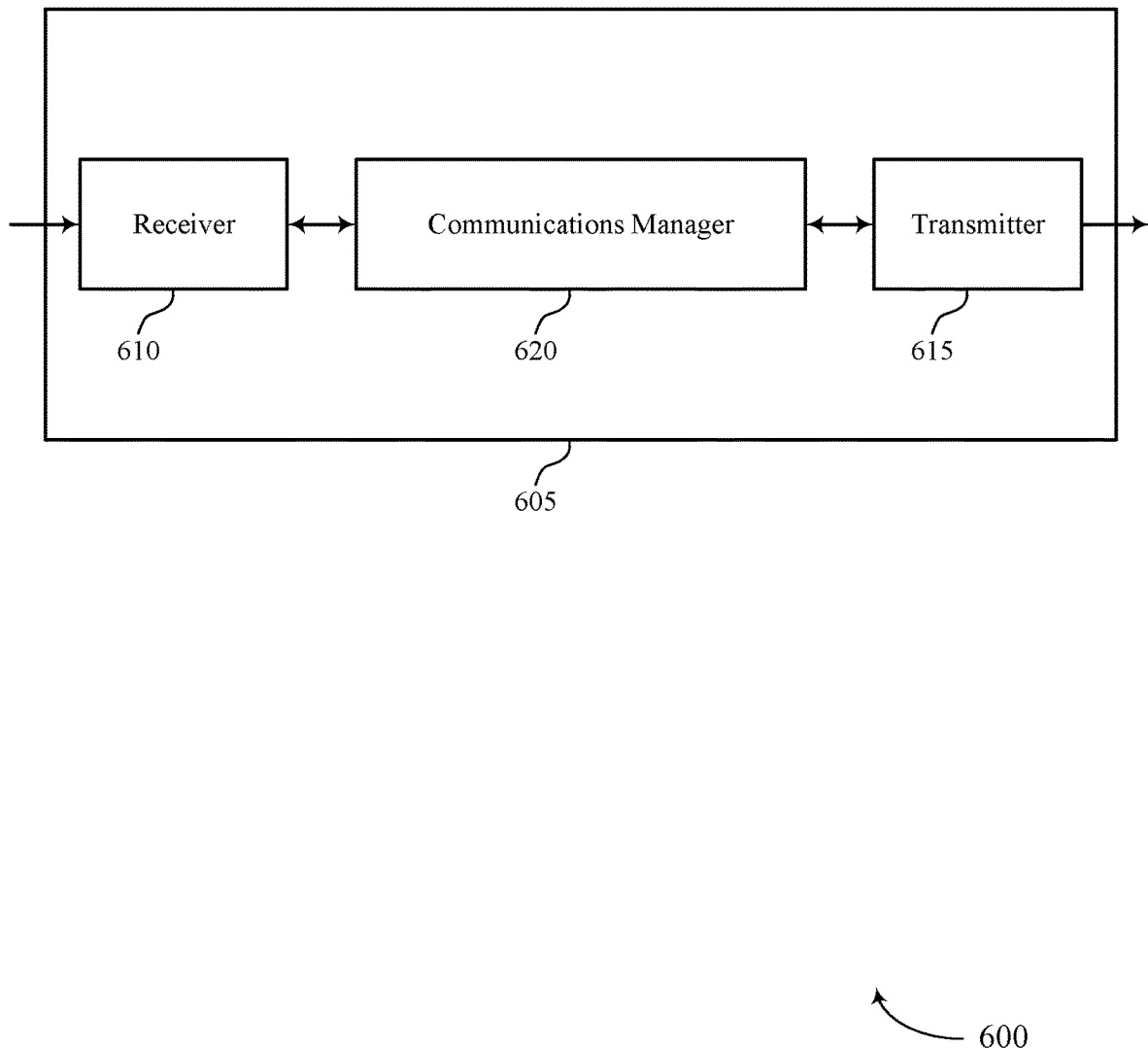
FIGS. 6 and 7 show block diagrams of devices that support sidelink transmission pre-emption in accordance with aspects of the present disclosure.

FIG. 6 shows a block diagram 600 of a device 605 that supports sidelink transmission pre-emption in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink transmission pre-emption). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink transmission pre-emption). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink transmission pre-emption as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for scheduling a first sidelink message for transmission on a first resource of a first carrier of a set of multiple carriers on which the UE is configured for sidelink carrier aggregation. The communications manager 620 may be configured as or otherwise support a means for scheduling a second sidelink message after the first sidelink message is scheduled, the second sidelink message being scheduled for transmission on a second resource of a second carrier of the set of multiple carriers, the first resource and the second resource at least partially overlapping in time. The communications manager 620 may be configured as or otherwise support a means for determining that a transmission capability of the UE pertaining to overlapping sidelink transmissions has been exceeded by the scheduling of the second sidelink message. The communications manager 620 may be configured as or otherwise support a means for pre-empting transmission of the first sidelink message in favor of transmission of the second sidelink message based on the transmission capability of the UE being exceeded.

By including or configuring the communications manager 620 in accordance with examples as described herein, the device 605 (e.g., a processor controlling or otherwise coupled to the receiver 610, the transmitter 615, the communications manager 620, or a combination thereof) may improve communication resource utilization efficiency associated with transmitting sidelink messages. For example, by pre-empting transmission of a lower-priority sidelink message in favor of transmission of a higher-priority sidelink message, the device 605 may increase throughput and reduce latency associated with transmitting high priority sidelink messages.

Figure 7:
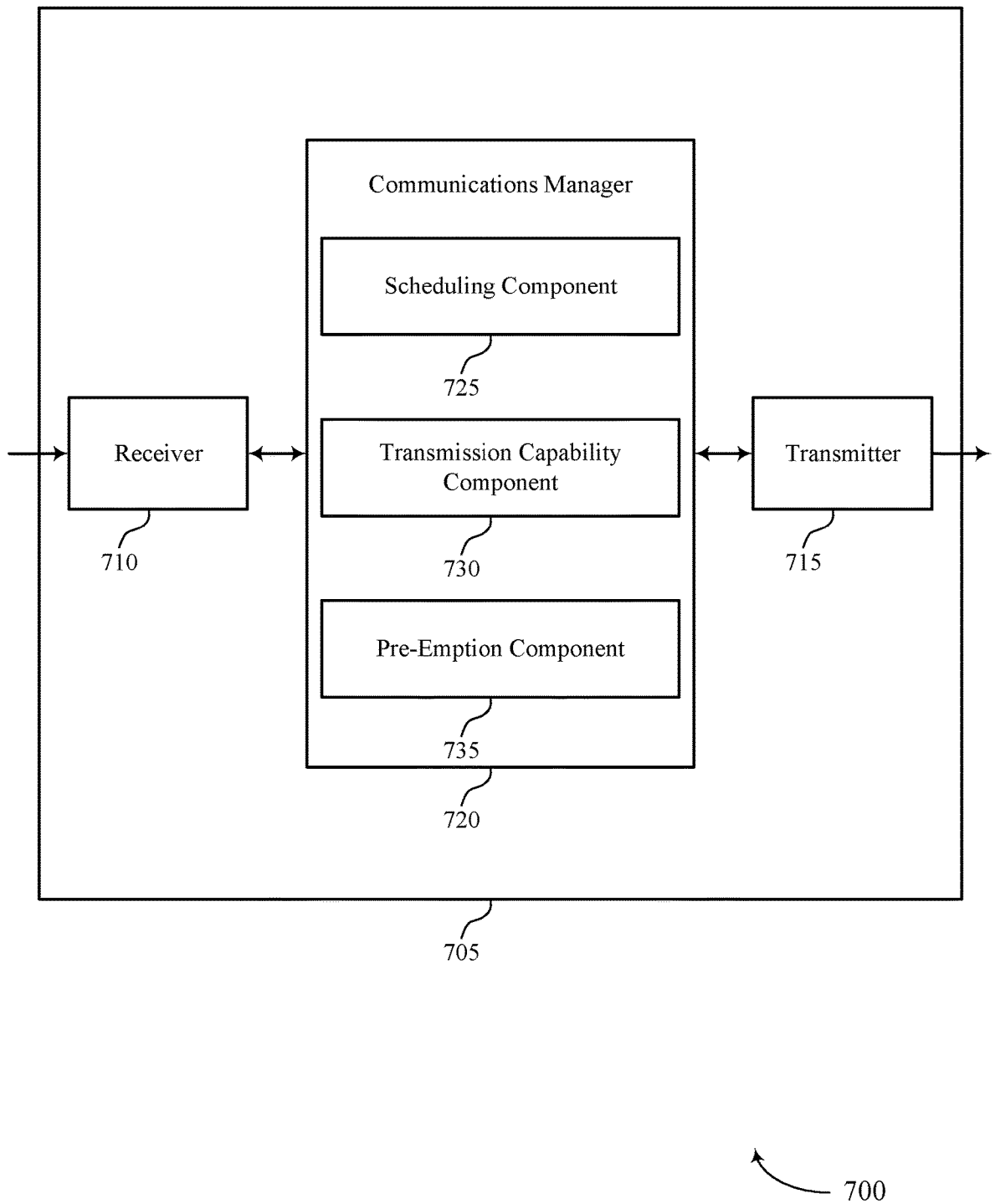

FIG. 7 shows a block diagram 700 of a device 705 that supports sidelink transmission pre-emption in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink transmission pre-emption). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink transmission pre-emption). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink transmission pre-emption as described herein. For example, the communications manager 720 may include a scheduling component 725, a transmission capability component 730, a pre-emption component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The scheduling component 725 may be configured as or otherwise support a means for scheduling a first sidelink message for transmission on a first resource of a first carrier of a set of multiple carriers on which the UE is configured for sidelink carrier aggregation. The scheduling component 725 may be configured as or otherwise support a means for scheduling a second sidelink message after the first sidelink message is scheduled, the second sidelink message being scheduled for transmission on a second resource of a second carrier of the set of multiple carriers, the first resource and the second resource at least partially overlapping in time. The transmission capability component 730 may be configured as or otherwise support a means for determining that a transmission capability of the UE pertaining to overlapping sidelink transmissions has been exceeded by the scheduling of the second sidelink message. The pre-emption component 735 may be configured as or otherwise support a means for pre-empting transmission of the first sidelink message in favor of transmission of the second sidelink message based on the transmission capability of the UE being exceeded.

Figure 8:
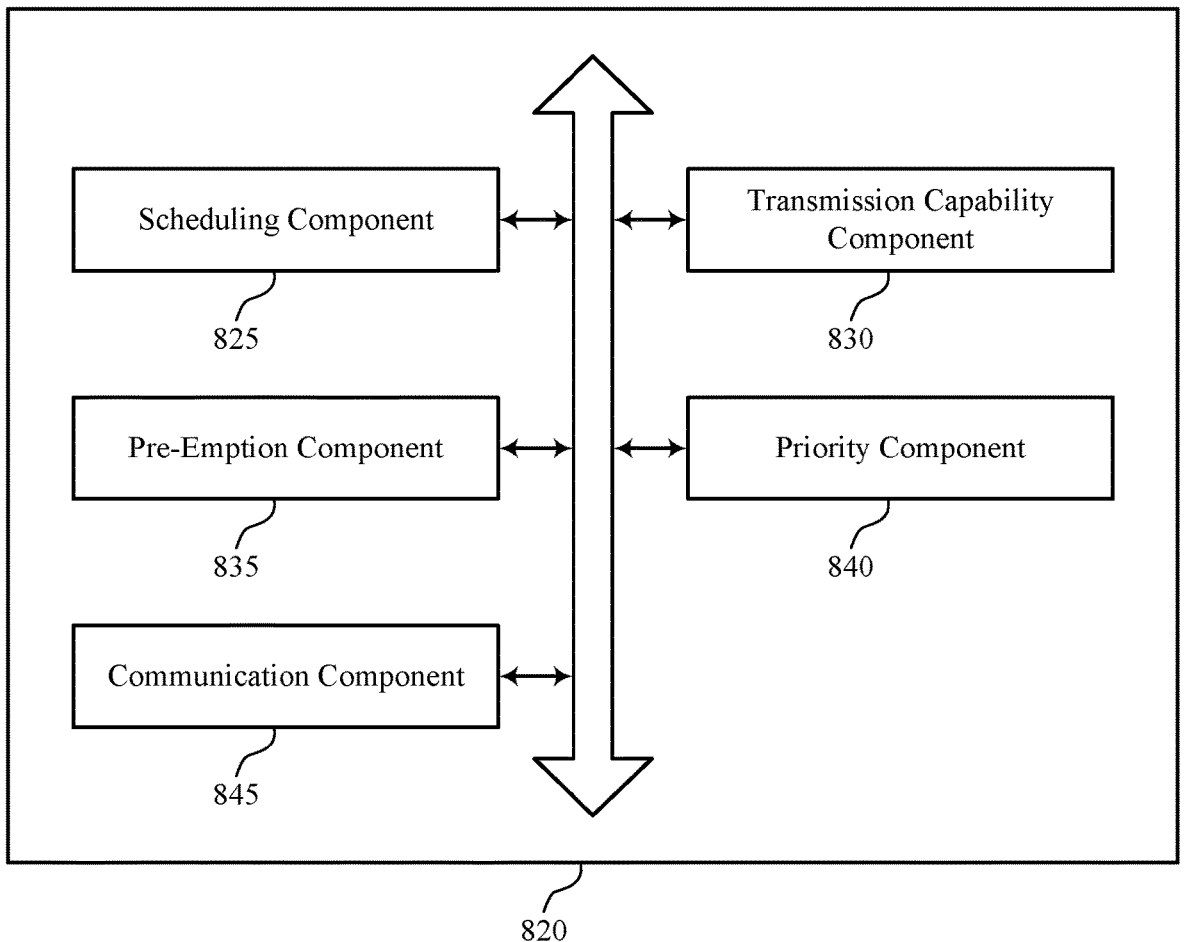
FIG. 8 shows a block diagram of a communications manager that supports sidelink transmission pre-emption in accordance with aspects of the present disclosure.

FIG. 8 shows a block diagram 800 of a communications manager 820 that supports sidelink transmission pre-emption in accordance with aspects of the present disclosure. The communications manager 820 may be an example of aspects of a communications manager 620, a communications manager 720, or both, as described herein. The communications manager 820, or various components thereof, may be an example of means for performing various aspects of sidelink transmission pre-emption as described herein. For example, the communications manager 820 may include a scheduling component 825, a transmission capability component 830, a pre-emption component 835, a priority component 840, a communication component 845, or any combination thereof. Each of these components may communicate, directly or indirectly, with one another (e.g., via one or more buses).

The communications manager 820 may support wireless communication at a UE in accordance with examples as disclosed herein. The scheduling component 825 may be configured as or otherwise support a means for scheduling a first sidelink message for transmission on a first resource of a first carrier of a set of multiple carriers on which the UE is configured for sidelink carrier aggregation. In some examples, the scheduling component 825 may be configured as or otherwise support a means for scheduling a second sidelink message after the first sidelink message is scheduled, the second sidelink message being scheduled for transmission on a second resource of a second carrier of the set of multiple carriers, the first resource and the second resource at least partially overlapping in time. The transmission capability component 830 may be configured as or otherwise support a means for determining that a transmission capability of the UE pertaining to overlapping sidelink transmissions has been exceeded by the scheduling of the second sidelink message. The pre-emption component 835 may be configured as or otherwise support a means for pre-empting transmission of the first sidelink message in favor of transmission of the second sidelink message based on the transmission capability of the UE being exceeded.

In some examples, to support pre-empting transmission of the first sidelink message in favor of transmission of the second sidelink message, the priority component 840 may be configured as or otherwise support a means for determining a first priority associated with the first sidelink message and a second priority associated with the second sidelink message. In some examples, to support pre-empting transmission of the first sidelink message in favor of transmission of the second sidelink message, the communication component 845 may be configured as or otherwise support a means for transmitting the second sidelink message while not transmitting the first sidelink message based on the second priority being greater than the first priority.

In some examples, the scheduling component 825 may be configured as or otherwise support a means for determining that the second sidelink message is scheduled at least a threshold period of time prior to the overlapping first resource and second resource, where pre-empting transmission of the first sidelink message in favor of transmission of the second sidelink message is based on the second sidelink message being scheduled at least the threshold period of time prior to the overlapping first resource and second resource.

In some examples, the first sidelink message and the second sidelink message are any one of sidelink control channel messages for reservation of resources, sidelink shared channel messages on reserved resources, sidelink feedback channel messages, or any combination thereof.

In some examples, the first sidelink message and the second sidelink message are directed to a same UE.

In some examples, the first sidelink message and the second sidelink message are directed to different UEs.

In some examples, the first sidelink message and the second sidelink message are of a same cast type.

In some examples, the first sidelink message and the second sidelink message are of different cast types.

In some examples, the transmission capability of the UE corresponds to a maximum quantity of concurrent sidelink messages that the UE transmits across the set of multiple carriers.

In some examples, the transmission capability component 830 may be configured as or otherwise support a means for determining a first transmission capability associated with a first quantity of concurrent sidelink messages that the UE transmits across the set of multiple carriers in accordance with sidelink resource scheduling by a base station. In some examples, the communication component 845 may be configured as or otherwise support a means for reporting the first transmission capability to the base station. In some examples, the transmission capability component 830 may be configured as or otherwise support a means for determining a second transmission capability associated with a second quantity of concurrent sidelink messages that the UE transmits across the set of multiple carriers in accordance with sidelink resource scheduling by the UE, where pre-empting transmission of the first sidelink message in favor of transmission of the second sidelink message is based on the second transmission capability of the UE being exceeded.

In some examples, to support determining that the transmission capability of the UE has been exceeded by the scheduling of the second sidelink message, the transmission capability component 830 may be configured as or otherwise support a means for determining that the first transmission capability has not been exceeded by sidelink resource scheduling by the base station. In some examples, to support determining that the transmission capability of the UE has been exceeded by the scheduling of the second sidelink message, the transmission capability component 830 may be configured as or otherwise support a means for updating the second transmission capability based on excess capacity associated with the first transmission capability not being exceeded, where determining that the transmission capability of the UE has been exceeded includes determining that the updated second transmission capability has been exceeded.

In some examples, the transmission capability component 830 may be configured as or otherwise support a means for determining the transmission capability based on a quantity of concurrent sidelink messages that the UE transmits across the set of multiple carriers in accordance with both first sidelink resource scheduling by a base station and second sidelink resource scheduling by the UE.

In some examples, pre-empting transmission of the first sidelink message in favor of transmission of the second sidelink message is based on a channel type associated with the first sidelink message or the second sidelink message, or both, a cast type associated with the first sidelink message or the second sidelink message, or both, a transmission power associated with the first sidelink message or the second sidelink message, or both, a resource allocation mode associated with the first sidelink message or the second sidelink message, or both, or a combination thereof.

In some examples, pre-empting transmission of the first sidelink message in favor of transmission of the second sidelink message is based on information carried by the first sidelink message or the second sidelink message, or both. In some examples, the information includes a CSI-RS report, a CSI-RS resource HARQ feedback, or a combination thereof.

In some examples, pre-empting transmission of the first sidelink message in favor of transmission of the second sidelink message is based on a destination ID associated with the first sidelink message or the second sidelink message, or both, a zone ID associated with the first sidelink message or the second sidelink message, or both, a carrier index associated with the first sidelink message or the second sidelink message, or both, a resource pool index associated with the first sidelink message or the second sidelink message, or both, a CBR associated with the first sidelink message or the second sidelink message, or both, a CR associated with the first sidelink message or the second sidelink message, or both, or a combination thereof.

Figure 9:
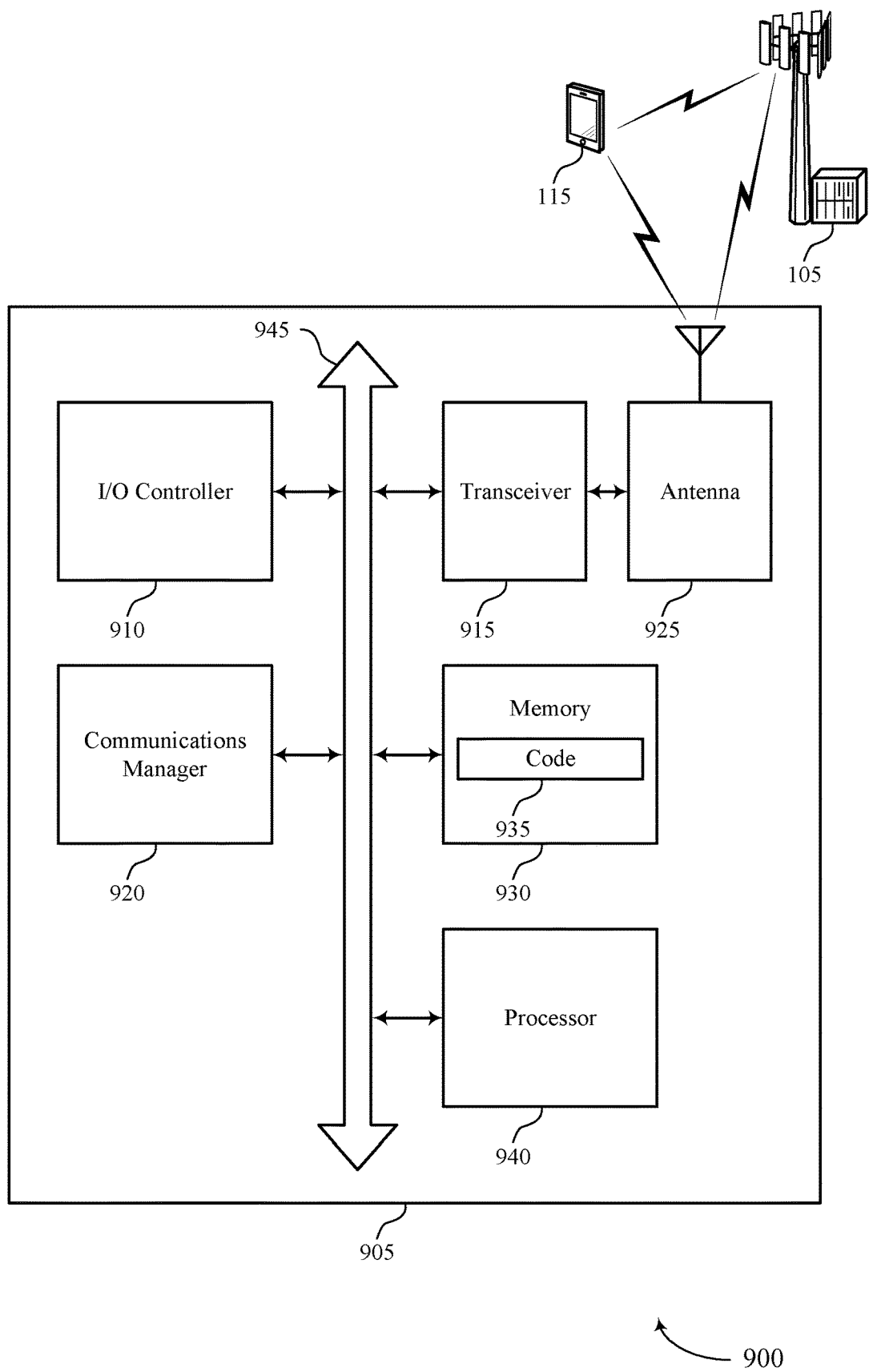
FIG. 9 shows a diagram of a system including a device that supports sidelink transmission pre-emption in accordance with aspects of the present disclosure.

FIG. 9 shows a diagram of a system 900 including a device 905 that supports sidelink transmission pre-emption in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink transmission pre-emption). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for scheduling a first sidelink message for transmission on a first resource of a first carrier of a set of multiple carriers on which the UE is configured for sidelink carrier aggregation. The communications manager 920 may be configured as or otherwise support a means for scheduling a second sidelink message after the first sidelink message is scheduled, the second sidelink message being scheduled for transmission on a second resource of a second carrier of the set of multiple carriers, the first resource and the second resource at least partially overlapping in time. The communications manager 920 may be configured as or otherwise support a means for determining that a transmission capability of the UE pertaining to overlapping sidelink transmissions has been exceeded by the scheduling of the second sidelink message. The communications manager 920 may be configured as or otherwise support a means for pre-empting transmission of the first sidelink message in favor of transmission of the second sidelink message based on the transmission capability of the UE being exceeded.

By including or configuring the communications manager 920 in accordance with examples as described herein, the device 905 may increase throughput and reduce latency associated with transmitting sidelink messages. For example, pre-empting transmission of a first sidelink message in favor of transmission of a second sidelink message may increase throughput and reduce latency associated with transmitting high priority sidelink messages. Additionally, pre-empting transmission of a first sidelink message may promote improvements to efficiency and resource usage of transmitting sidelink messages and, in some examples, may promote spectral efficiency, reduce power consumption, improve coordination between UEs, and increase battery life, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink transmission pre-emption as described herein, or the processor 940 and the memory 930 may be otherwise configured to perform or support such operations.

Figure 10:
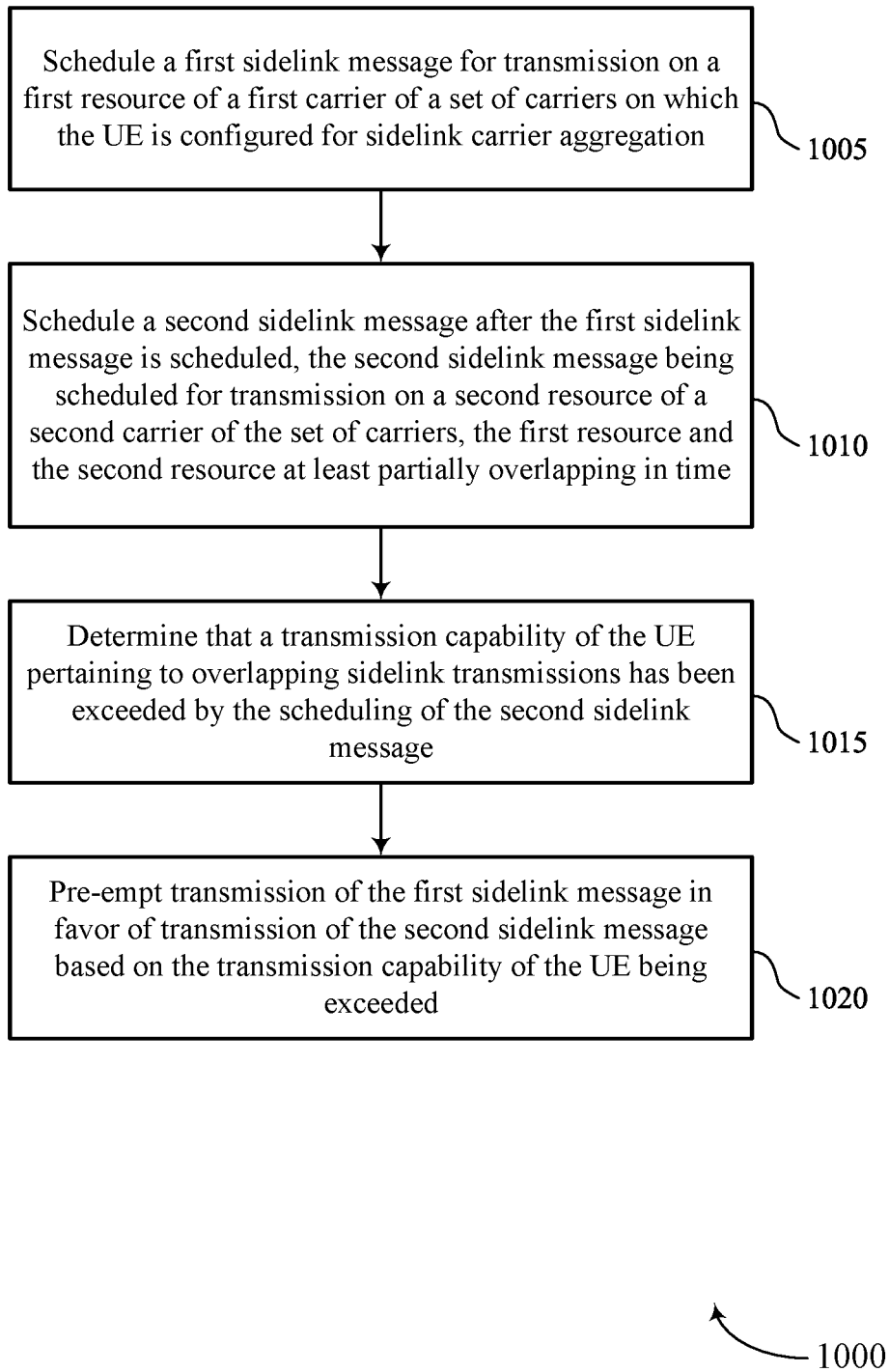
FIGS. 10 through 12 show flowcharts illustrating methods that support sidelink transmission pre-emption in accordance with aspects of the present disclosure.

FIG. 10 shows a flowchart illustrating a method 1000 that supports sidelink transmission pre-emption in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include scheduling a first sidelink message for transmission on a first resource of a first carrier of a set of multiple carriers on which the UE is configured for sidelink carrier aggregation. The operations of 1005 may be performed in accordance with examples as disclosed herein. In some examples, aspects of the operations of 1005 may be performed by a scheduling component 825 as described with reference to FIG. 8.

At 1010, the method may include scheduling a second sidelink message after the first sidelink message is scheduled, the second sidelink message being scheduled for transmission on a second resource of a second carrier of the set of multiple carriers, the first resource and the second resource at least partially overlapping in time. The operations of 1010 may be performed in accordance with examples as disclosed herein. In some examples, aspects of the operations of 1010 may be performed by a scheduling component 825 as described with reference to FIG. 8.

At 1015, the method may include determining that a transmission capability of the UE pertaining to overlapping sidelink transmissions has been exceeded by the scheduling of the second sidelink message. The operations of 1015 may be performed in accordance with examples as disclosed herein. In some examples, aspects of the operations of 1015 may be performed by a transmission capability component 830 as described with reference to FIG. 8.

At 1020, the method may include pre-empting transmission of the first sidelink message in favor of transmission of the second sidelink message based on the transmission capability of the UE being exceeded. The operations of 1020 may be performed in accordance with examples as disclosed herein. In some examples, aspects of the operations of 1020 may be performed by a pre-emption component 835 as described with reference to FIG. 8.

Figure 11:
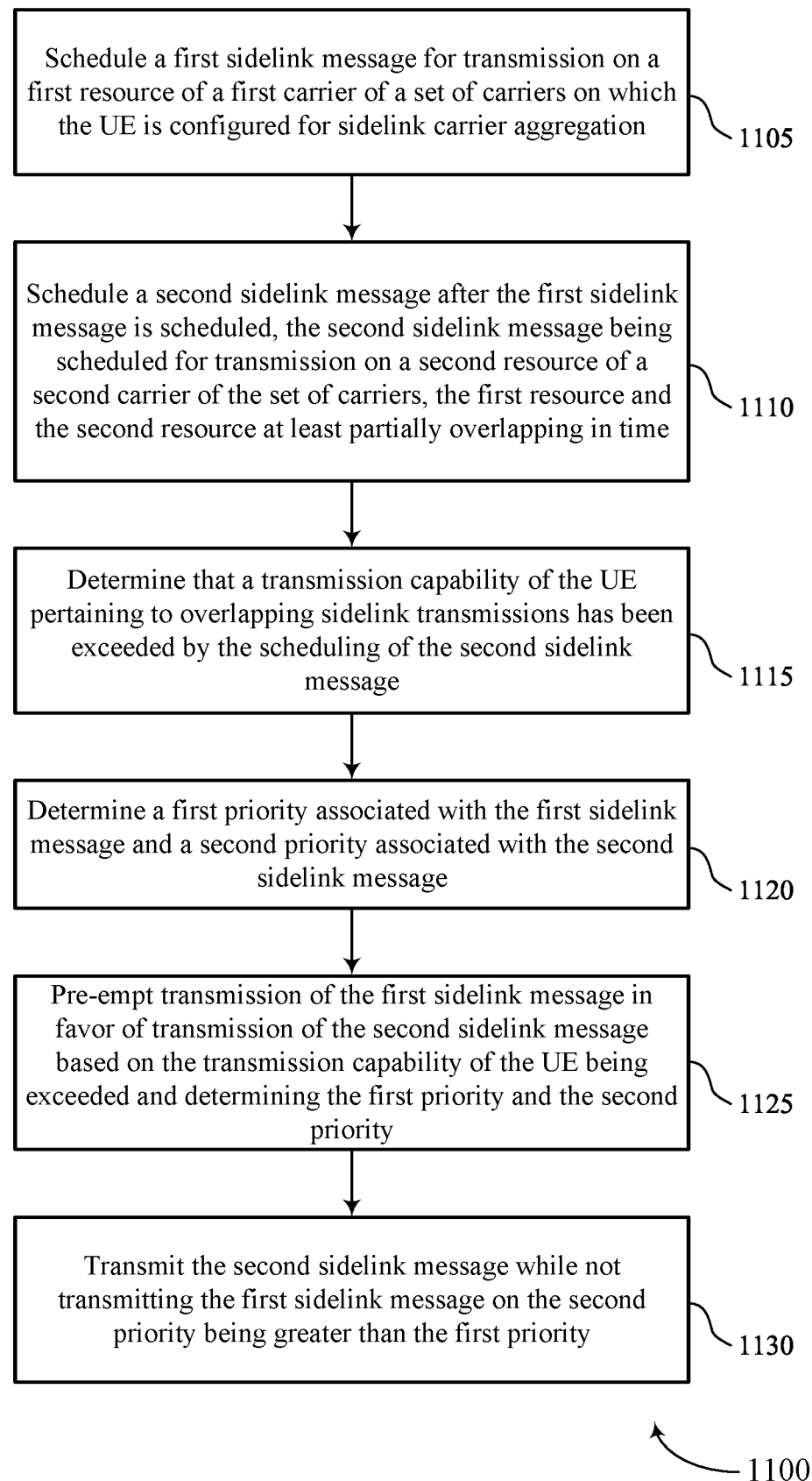

FIG. 11 shows a flowchart illustrating a method 1100 that supports sidelink transmission pre-emption in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include scheduling a first sidelink message for transmission on a first resource of a first carrier of a set of multiple carriers on which the UE is configured for sidelink carrier aggregation. The operations of 1105 may be performed in accordance with examples as disclosed herein. In some examples, aspects of the operations of 1105 may be performed by a scheduling component 825 as described with reference to FIG. 8.

At 1110, the method may include scheduling a second sidelink message after the first sidelink message is scheduled, the second sidelink message being scheduled for transmission on a second resource of a second carrier of the set of multiple carriers, the first resource and the second resource at least partially overlapping in time. The operations of 1110 may be performed in accordance with examples as disclosed herein. In some examples, aspects of the operations of 1110 may be performed by a scheduling component 825 as described with reference to FIG. 8.

At 1115, the method may include determining that a transmission capability of the UE pertaining to overlapping sidelink transmissions has been exceeded by the scheduling of the second sidelink message. The operations of 1115 may be performed in accordance with examples as disclosed herein. In some examples, aspects of the operations of 1115 may be performed by a transmission capability component 830 as described with reference to FIG. 8.

At 1120, the method may include determining a first priority associated with the first sidelink message and a second priority associated with the second sidelink message. The operations of 1120 may be performed in accordance with examples as disclosed herein. In some examples, aspects of the operations of 1120 may be performed by a priority component 840 as described with reference to FIG. 8.

At 1125, the method may include pre-empting transmission of the first sidelink message in favor of transmission of the second sidelink message based on the transmission capability of the UE being exceeded and determining the first priority and the second priority. The operations of 1125 may be performed in accordance with examples as disclosed herein. In some examples, aspects of the operations of 1125 may be performed by a pre-emption component 835 as described with reference to FIG. 8.

At 1130, the method may include transmitting the second sidelink message while not transmitting the first sidelink message based on the second priority being greater than the first priority. The operations of 1130 may be performed in accordance with examples as disclosed herein. In some examples, aspects of the operations of 1130 may be performed by a communication component 845 as described with reference to FIG. 8.

Figure 12:
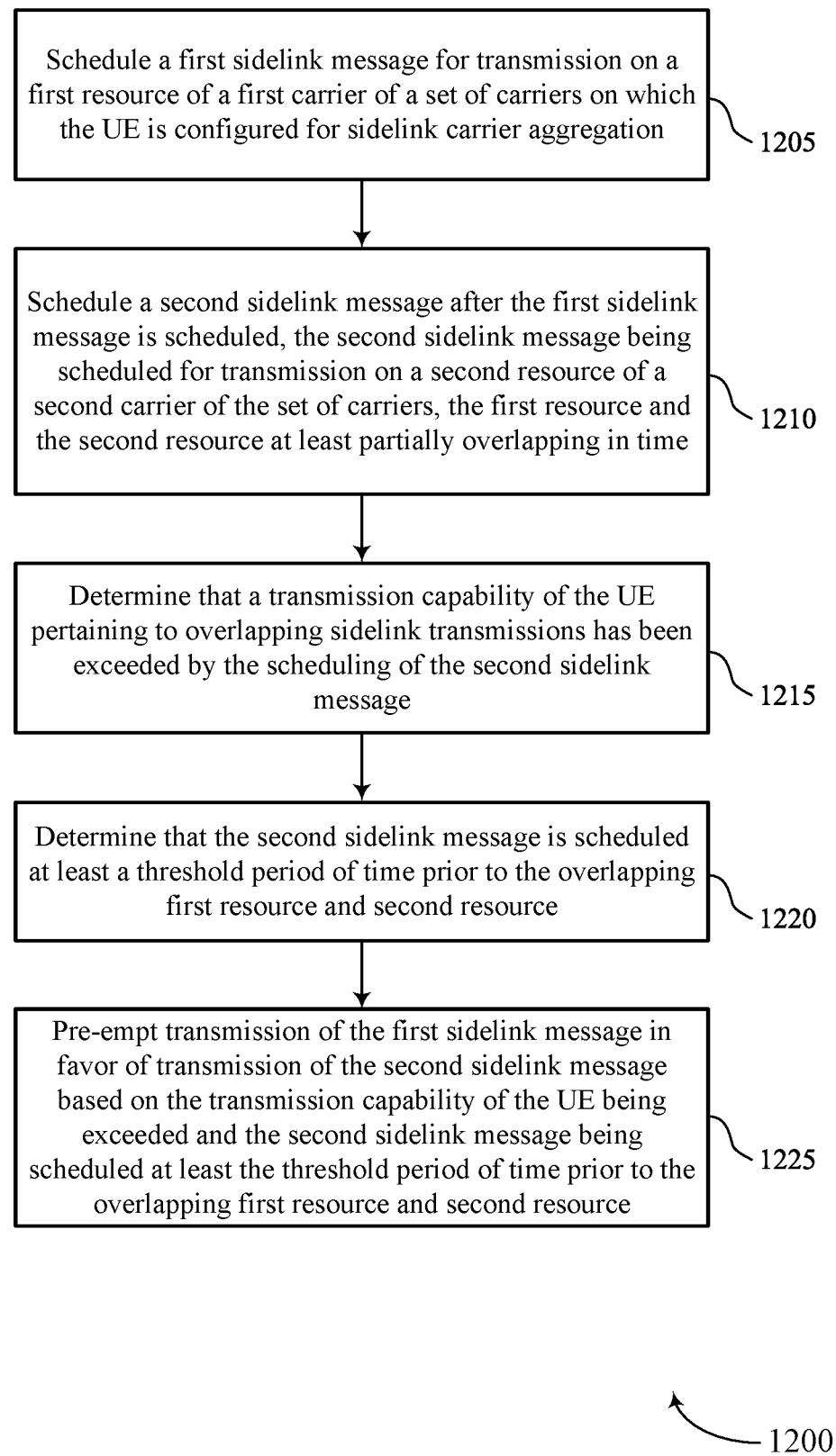

FIG. 12 shows a flowchart illustrating a method 1200 that supports sidelink transmission pre-emption in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include scheduling a first sidelink message for transmission on a first resource of a first carrier of a set of multiple carriers on which the UE is configured for sidelink carrier aggregation. The operations of 1205 may be performed in accordance with examples as disclosed herein. In some examples, aspects of the operations of 1205 may be performed by a scheduling component 825 as described with reference to FIG. 8.

At 1210, the method may include scheduling a second sidelink message after the first sidelink message is scheduled, the second sidelink message being scheduled for transmission on a second resource of a second carrier of the set of multiple carriers, the first resource and the second resource at least partially overlapping in time. The operations of 1210 may be performed in accordance with examples as disclosed herein. In some examples, aspects of the operations of 1210 may be performed by a scheduling component 825 as described with reference to FIG. 8.

At 1215, the method may include determining that a transmission capability of the UE pertaining to overlapping sidelink transmissions has been exceeded by the scheduling of the second sidelink message. The operations of 1215 may be performed in accordance with examples as disclosed herein. In some examples, aspects of the operations of 1215 may be performed by a transmission capability component 830 as described with reference to FIG. 8.

At 1220, the method may include determining that the second sidelink message is scheduled at least a threshold period of time prior to the overlapping first resource and second resource. The operations of 1220 may be performed in accordance with examples as disclosed herein. In some examples, aspects of the operations of 1220 may be performed by a scheduling component 825 as described with reference to FIG. 8.

At 1225, the method may include pre-empting transmission of the first sidelink message in favor of transmission of the second sidelink message based on the transmission capability of the UE being exceeded and the second sidelink message being scheduled at least the threshold period of time prior to the overlapping first resource and second resource. The operations of 1225 may be performed in accordance with examples as disclosed herein. In some examples, aspects of the operations of 1225 may be performed by a pre-emption component 835 as described with reference to FIG. 8.

The following provides an overview of aspects of the present disclosure:

Aspect 1: A method for wireless communication at a UE, comprising: scheduling a first sidelink message for transmission on a first resource of a first carrier of a plurality of carriers on which the UE is configured for sidelink carrier aggregation; scheduling a second sidelink message after the first sidelink message is scheduled, the second sidelink message being scheduled for transmission on a second resource of a second carrier of the plurality of carriers, the first resource and the second resource at least partially overlapping in time; determining that a transmission capability of the UE pertaining to overlapping sidelink transmissions has been exceeded by the scheduling of the second sidelink message; and pre-empting transmission of the first sidelink message in favor of transmission of the second sidelink message based at least in part on the transmission capability of the UE being exceeded.

Aspect 2: The method of aspect 1, wherein pre-empting transmission of the first sidelink message in favor of transmission of the second sidelink message comprises: determining a first priority associated with the first sidelink message and a second priority associated with the second sidelink message; and transmitting the second sidelink message while not transmitting the first sidelink message based at least in part on the second priority being greater than the first priority.

Aspect 3: The method of any of aspects 1 through 2, further comprising: determining that the second sidelink message is scheduled at least a threshold period of time prior to the overlapping first resource and second resource, wherein pre-empting transmission of the first sidelink message in favor of transmission of the second sidelink message is based at least in part on the second sidelink message being scheduled at least the threshold period of time prior to the overlapping first resource and second resource.

Aspect 4: The method of any of aspects 1 through 3, wherein the first sidelink message and the second sidelink message are any one of sidelink control channel messages for reservation of resources, sidelink shared channel messages on reserved resources, sidelink feedback channel messages, or any combination thereof.

Aspect 5: The method of any of aspects 1 through 4, wherein the first sidelink message and the second sidelink message are directed to a same UE.

Aspect 6: The method of any of aspects 1 through 4, wherein the first sidelink message and the second sidelink message are directed to different UEs.

Aspect 7: The method of any of aspects 1 through 6, wherein the first sidelink message and the second sidelink message are of a same cast type.

Aspect 8: The method of any of aspects 1 through 6, wherein the first sidelink message and the second sidelink message are of different cast types.

Aspect 9: The method of any of aspects 1 through 8, wherein the transmission capability of the UE corresponds to a maximum quantity of concurrent sidelink messages that the UE transmits across the plurality of carriers.

Aspect 10: The method of any of aspects 1 through 9, further comprising: determining a first transmission capability associated with a first quantity of concurrent sidelink messages that the UE transmits across the plurality of carriers in accordance with sidelink resource scheduling by a base station; reporting the first transmission capability to the base station; and determining a second transmission capability associated with a second quantity of concurrent sidelink messages that the UE transmits across the plurality of carriers in accordance with sidelink resource scheduling by the UE, wherein pre-empting transmission of the first sidelink message in favor of transmission of the second sidelink message is based at least in part on the second transmission capability of the UE being exceeded.

Aspect 11: The method of aspect 10, wherein determining that the transmission capability of the UE has been exceeded by the scheduling of the second sidelink message further comprises: determining that the first transmission capability has not been exceeded by sidelink resource scheduling by the base station; and updating the second transmission capability based on excess capacity associated with the first transmission capability not being exceeded, wherein determining that the transmission capability of the UE has been exceeded includes determining that the updated second transmission capability has been exceeded.

Aspect 12: The method of any of aspects 1 through 11, further comprising: determining the transmission capability based on a quantity of concurrent sidelink messages that the UE transmits across the plurality of carriers in accordance with both first sidelink resource scheduling by a base station and second sidelink resource scheduling by the UE.

Aspect 13: The method of any of aspects 1 through 12, wherein pre-empting transmission of the first sidelink message in favor of transmission of the second sidelink message is based at least in part on a channel type associated with the first sidelink message or the second sidelink message, or both, a cast type associated with the first sidelink message or the second sidelink message, or both, a transmission power associated with the first sidelink message or the second sidelink message, or both, a resource allocation mode associated with the first sidelink message or the second sidelink message, or both, or a combination thereof.

Aspect 14: The method of any of aspects 1 through 13, wherein pre-empting transmission of the first sidelink message in favor of transmission of the second sidelink message is based at least in part on information carried by the first sidelink message or the second sidelink message, or both, the information comprises a CSI-RS report, a CSI-RS resource, HARQ feedback, or a combination thereof.

Aspect 15: The method of any of aspects 1 through 14, wherein pre-empting transmission of the first sidelink message in favor of transmission of the second sidelink message is based at least in part on a destination ID associated with the first sidelink message or the second sidelink message, or both, a zone ID associated with the first sidelink message or the second sidelink message, or both, a carrier index associated with the first sidelink message or the second sidelink message, or both, a resource pool index associated with the first sidelink message or the second sidelink message, or both, a CBR associated with the first sidelink message or the second sidelink message, or both, a CR associated with the first sidelink message or the second sidelink message, or both, or a combination thereof.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    scheduling a first sidelink message for transmission by the UE on a first resource of a first carrier of a plurality of carriers on which the UE is configured for sidelink carrier aggregation;
    scheduling a second sidelink message after the first sidelink message is scheduled, the second sidelink message being scheduled for transmission by the UE on a second resource of a second carrier of the plurality of carriers, the first resource and the second resource at least partially overlapping in time; and
    pre-empting transmission of the first sidelink message in favor of transmission of the second sidelink message based at least in part on:
        determination that a threshold quantity of concurrent sidelink messages transmittable by the UE has been exceeded based at least in part on the second sidelink message being scheduled, the threshold quantity of concurrent sidelink messages corresponding to a first transmission capability of the UE or a second transmission capability of the UE, wherein the first transmission capability of the UE corresponds to a first quantity of concurrent sidelink messages transmittable by the UE across the plurality of carriers in accordance with sidelink resource scheduling by the UE, and wherein the second transmission capability of the UE corresponds to a second quantity of concurrent sidelink messages transmittable by the UE across the plurality of carriers in accordance with sidelink resource scheduling by a network device, and
        determination that a first priority associated with the first sidelink message is less than a second priority associated with the second sidelink message.

2. The method of claim 1, wherein pre-empting transmission of the first sidelink message in favor of transmission of the second sidelink message comprises:
    transmitting the second sidelink message while not transmitting the first sidelink message based at least in part on the second priority being greater than the first priority.

3. The method of claim 1, further comprising:
    determining that the second sidelink message is scheduled at least a threshold period of time prior to the overlapping first resource and second resource, wherein pre-empting transmission of the first sidelink message in favor of transmission of the second sidelink message is further based at least in part on the second sidelink message being scheduled at least the threshold period of time prior to the overlapping first resource and second resource.

4. The method of claim 1, wherein the first sidelink message and the second sidelink message are any one of sidelink control channel messages for reservation of resources, sidelink shared channel messages on reserved resources, sidelink feedback channel messages, or any combination thereof.

5. The method of claim 1, wherein the first sidelink message and the second sidelink message are directed to a same UE.

6. The method of claim 1, wherein the first sidelink message and the second sidelink message are directed to different UEs.

7. The method of claim 1, wherein the first sidelink message and the second sidelink message are of a same cast type.

8. The method of claim 1, wherein the first sidelink message and the second sidelink message are of different cast types.

9. The method of claim 1, wherein the first transmission capability of the UE corresponds to a maximum quantity of concurrent sidelink messages transmittable by the UE across the plurality of carriers in accordance with sidelink resource scheduling by the UE, wherein the first quantity is the maximum quantity.

10. The method of claim 1, further comprising:
reporting the second transmission capability to the network device.

11. The method of claim 1, further comprising:
determining that the second transmission capability has not been exceeded by sidelink resource scheduling by the network device;
updating the first transmission capability based on excess capacity associated with the second transmission capability not being exceeded; and
determining that the first transmission capability of the UE has been exceeded based on the updated first transmission capability being exceeded.

12. The method of claim 1, wherein pre-empting transmission of the first sidelink message in favor of transmission of the second sidelink message is further based at least in part on a channel type associated with the first sidelink message or the second sidelink message, or both, a cast type associated with the first sidelink message or the second sidelink message, or both, a transmission power associated with the first sidelink message or the second sidelink message, or both, a resource allocation mode associated with the first sidelink message or the second sidelink message, or both, or a combination thereof.

13. The method of claim 1, wherein:
pre-empting transmission of the first sidelink message in favor of transmission of the second sidelink message is further based at least in part on information carried by the first sidelink message or the second sidelink message, or both; and
the information comprises a channel state information-reference signal report, a channel state information-reference signal resource, hybrid automatic repeat request feedback, or a combination thereof.

14. The method of claim 1, wherein pre-empting transmission of the first sidelink message in favor of transmission of the second sidelink message is further based at least in part on a destination identifier associated with the first sidelink message or the second sidelink message, or both, a zone identifier associated with the first sidelink message or the second sidelink message, or both, a carrier index associated with the first sidelink message or the second sidelink message, or both, a resource pool index associated with the first sidelink message or the second sidelink message, or both, a channel busy ratio associated with the first sidelink message or the second sidelink message, or both, a channel occupancy ratio associated with the first sidelink message or the second sidelink message, or both, or a combination thereof.

15. An apparatus for wireless communication at a user equipment (UE), comprising:
one or more processors;
memory coupled with the one or more processors; and
instructions stored in the memory and executable by the one or more processors to cause the apparatus to:
schedule a first sidelink message for transmission by the UE on a first resource of a first carrier of a plurality of carriers on which the UE is configured for sidelink carrier aggregation;
schedule a second sidelink message after the first sidelink message is scheduled, the second sidelink message being scheduled for transmission by the UE on a second resource of a second carrier of the plurality of carriers, the first resource and the second resource at least partially overlapping in time; and
pre-empt transmission of the first sidelink message in favor of transmission of the second sidelink message based at least in part on:
determination that a threshold quantity of concurrent sidelink messages transmittable by the UE has been exceeded based at least in part on the second sidelink message being scheduled, the threshold quantity of concurrent sidelink messages corresponding to a first transmission capability of the UE or a second transmission capability of the UE, wherein the first transmission capability of the UE corresponds to a first quantity of concurrent sidelink messages transmittable by the UE across the plurality of carriers in accordance with sidelink resource scheduling by the UE, and wherein the second transmission capability of the UE corresponds to a second quantity of concurrent sidelink messages transmittable by the UE across the plurality of carriers in accordance with sidelink resource scheduling by a network device; and
determination that a first priority associated with the first sidelink message is less than a second priority associated with the second sidelink message.

16. The apparatus of claim 15, wherein the instructions to pre-empt transmission of the first sidelink message in favor of transmission of the second sidelink message are executable by the one or more processors to cause the apparatus to:
transmit the second sidelink message while not transmitting the first sidelink message based at least in part on the second priority being greater than the first priority.

17. The apparatus of claim 15, wherein the instructions are further executable by the one or more processors to cause the apparatus to:
determine that the second sidelink message is scheduled at least a threshold period of time prior to the overlapping first resource and second resource, wherein pre-empting transmission of the first sidelink message in favor of transmission of the second sidelink message is further based at least in part on the second sidelink message being scheduled at least the threshold period of time prior to the overlapping first resource and second resource.

18. The apparatus of claim 15, wherein the first sidelink message and the second sidelink message are any one of sidelink control channel messages for reservation of resources, sidelink shared channel messages on reserved resources, sidelink feedback channel messages, or any combination thereof.

19. The apparatus of claim 15, wherein the first transmission capability of the UE corresponds to a maximum quantity of concurrent sidelink messages transmittable by the UE across the plurality of carriers in accordance with sidelink resource scheduling by the UE wherein the first quantity is the maximum quantity.

20. An apparatus for wireless communication at a user equipment (UE), comprising:
means for scheduling a first sidelink message for transmission by the UE on a first resource of a first carrier of a plurality of carriers on which the UE is configured for sidelink carrier aggregation;
means for scheduling a second sidelink message after the first sidelink message is scheduled, the second sidelink message being scheduled for transmission by the UE on a second resource of a second carrier of the plurality of carriers, the first resource and the second resource at least partially overlapping in time; and
means for pre-empting transmission of the first sidelink message in favor of transmission of the second sidelink message based at least in part on:
exceeding, based at least in part on scheduling the second sidelink message, a threshold quantity of concurrent sidelink messages transmittable by the UE, the threshold quantity of concurrent sidelink messages corresponding to a first transmission capability of the UE or a second transmission capability of the UE pertaining to overlapping sidelink transmissions, wherein the first transmission capability of the UE corresponds to a first quantity of concurrent sidelink messages transmittable by the UE across the plurality of carriers in accordance with sidelink resource scheduling by the UE, and wherein the second transmission capability of the UE corresponds to a second quantity of concurrent sidelink messages transmittable by the UE across the plurality of carriers in accordance with sidelink resource scheduling by a network device, and
a first priority associated with the first sidelink message being less than a second priority associated with the second sidelink message.

21. The apparatus of claim 20, wherein the means for pre-empting transmission of the first sidelink message in favor of transmission of the second sidelink message comprise:
and
means for transmitting the second sidelink message while not transmitting the first sidelink message based at least in part on the second priority being greater than the first priority.

22. The apparatus of claim 20, further comprising:
means for determining that the second sidelink message is scheduled at least a threshold period of time prior to the overlapping first resource and second resource, wherein pre-emptying transmission of the first sidelink message in favor of transmission of the second sidelink message is further based at least in part on the second sidelink message being scheduled at least the threshold period of time prior to the overlapping first resource and second resource.

23. The apparatus of claim 20, wherein the first sidelink message and the second sidelink message are any one of sidelink control channel messages for reservation of resources, sidelink shared channel messages on reserved resources, sidelink feedback channel messages, or any combination thereof.

24. The apparatus of claim 20, wherein the first transmission capability of the UE corresponds to a maximum quantity of concurrent sidelink messages transmittable by the UE across the plurality of carriers in accordance with sidelink resource scheduling by the UE, wherein the first quantity is the maximum quantity.

25. A non-transitory computer-readable medium storing code for wireless communication at a user equipment (UE), the code comprising instructions executable by a processor to:
schedule a first sidelink message for transmission by the UE on a first resource of a first carrier of a plurality of carriers on which the UE is configured for sidelink carrier aggregation;
schedule a second sidelink message after the first sidelink message is scheduled, the second sidelink message being scheduled for transmission by the UE on a second resource of a second carrier of the plurality of carriers, the first resource and the second resource at least partially overlapping in time; and
pre-empt transmission of the first sidelink message in favor of transmission of the second sidelink message based at least in part on:
exceeding, based at least in part on scheduling the second sidelink message, a threshold quantity of concurrent sidelink messages transmittable by the UE, the threshold quantity of concurrent sidelink messages corresponding to a first transmission capability of the UE or a second transmission capability of the UE pertaining to overlapping sidelink transmissions, wherein the first transmission capability of the UE corresponds to a first quantity of concurrent sidelink messages transmittable by the UE across the plurality of carriers in accordance with sidelink resource scheduling by the UE, and wherein the second transmission capability of the UE corresponds to a second quantity of concurrent sidelink messages transmittable by the UE across the plurality of carriers in accordance with sidelink resource scheduling by a network device, and
a first priority associated with the first sidelink message being less than a second priority associated with the second sidelink message.

26. The non-transitory computer-readable medium of claim 25, wherein the instructions to pre-empt transmission of the first sidelink message in favor of transmission of the second sidelink message are executable by the processor to:
transmit the second sidelink message while not transmitting the first sidelink message based at least in part on the second priority being greater than the first priority.

27. The non-transitory computer-readable medium of claim 25, wherein the instructions are further executable by the processor to:
determine that the second sidelink message is scheduled at least a threshold period of time prior to the overlapping first resource and second resource, wherein pre-empting transmission of the first sidelink message in favor of transmission of the second sidelink message is further based at least in part on the second sidelink message being scheduled at least the threshold period of time prior to the overlapping first resource and second resource.

28. The non-transitory computer-readable medium of claim 25, wherein the first sidelink message and the second sidelink message are any one of sidelink control channel messages for reservation of resources, sidelink shared channel messages on reserved resources, sidelink feedback channel messages, or any combination thereof.

29. The non-transitory computer-readable medium of claim 25, wherein the first transmission capability of the UE corresponds to a maximum quantity of concurrent sidelink messages transmittable by the UE across the plurality of carriers in accordance with sidelink resource scheduling by the UE, wherein the first quantity is the maximum quantity.

* * * * *